US005745683A

United States Patent [19]
Lee et al.

[11] Patent Number: 5,745,683
[45] Date of Patent: Apr. 28, 1998

[54] SYSTEM AND METHOD FOR ALLOWING DISPARATE NAMING SERVICE PROVIDERS TO DYNAMICALLY JOIN A NAMING FEDERATION

[75] Inventors: Rosanna K. Lee, Palo Alto; Rangaswamy Vasudevan, Los Altos Hills, both of Calif.

[73] Assignee: Sun Microsystems, Inc., Palo Alto, Calif.

[21] Appl. No.: 498,155

[22] Filed: Jul. 5, 1995

[51] Int. Cl.$^6$ .............................. G06F 3/00; G06F 13/00
[52] U.S. Cl. .............................. 395/200.8; 395/200.31; 395/200.33; 395/200.47; 395/200.75
[58] Field of Search .............................. 395/800, 200.16, 395/619, 200.01, 200.03, 200.09, 200.2, 200.3, 200.31, 200.33, 200.47, 200.48, 200.49, 200.55, 200.75, 200.8

[56] References Cited

U.S. PATENT DOCUMENTS

| | | | |
|---|---|---|---|
| 4,853,843 | 8/1989 | Ecklund | 395/619 |
| 5,136,716 | 8/1992 | Harvey et al. | 395/800 |
| 5,377,323 | 12/1994 | Vasudevan | 395/200.01 |

OTHER PUBLICATIONS

"Federal Naming Service"; SunSoft Revision 01, Apr. 1994.
"Federal Naming; The XFN Specification" X/Open, Jul. 1994.
"Solaris X/Open Federated Naming" Tech Spec Apr., 1995.
James Kempf and Peter B. Kessler; "Cross-address Space Dynamic Linking", Sep. 1992.
"Sunsoft CD Times", Apr. 1994; The 1994 Solaris Developer Conference.
X/Open News Release, X/Open Co. Ltd., "X/Open Adopts Federated Naming As Preliminary Specification", dated Jul. 6, 1994.
Brochure "The 1994 SOLARIS Developer Conference; The Blueprint—The Tools—The Power", SunSoft, Apr. 1994.

*Primary Examiner*—Meng-Ai T. An
*Attorney, Agent, or Firm*—Lowe, Price, LeBlanc & Becker

[57] ABSTRACT

The present invention provides an improved Federated Naming Framework System which includes a Federated Naming Service Provider Interface ("FN SPI") for four (4) kinds of Name Services (Atomic Name, Compound Name, Partial Composite Name and Composite Name) along with a mechanism, designated the "FN Framework", which sits between the Client application and these Name Services and supports the translation and administration of calls for resolution of composite names to allow Client applications to make appropriate use of the available FN SPIs (there may be more than one FN SPI in any given system). The improved Federated Naming Framework System provides mechanisms to define and process strong and weak separation in the determination of naming system boundaries. Moreover, the present invention allows system implementors to install new naming services either statically or dynamically without disruption of the Client applications.

29 Claims, 15 Drawing Sheets

Partial Composite Name Resolution

SYSTEM AND METHOD FOR ALLOWING DISPARATE NAMING SERVICE PROVIDERS TO DYNAMICALLY JOIN A NAMING FEDERATION

BACKGROUND OF THE INVENTION

1. Field of the Invention

The present invention relates to the fields of distributed computing systems, client-server computing and object oriented systems. Specifically, the present invention relates to the field of naming services and directory systems in distributed computing systems.

2. Background

In client-server computing, typically there is a set of computers that can communicate with one another through a network connecting the computers. Some of these computers act as providers of services or functionality to other computers. The providers of such service or functionality are known as "servers," and the consumers of such service or functionality are called "clients." The client-server model also generalizes to the case where distinct programs running on the same computer are communicating with one another through some protected mechanism and are acting as providers and consumers of functionality.

In an object oriented system, an object is a component comprising data and operations which can be invoked to manipulate the data. The operations are invoked on the object by sending calls to the object. Each object has an object type. The object type defines the operations that can be performed on objects of that type. The object operations are implemented independent of the objects themselves. Additionally, one object type may inherit the object operations defined and implemented for other object types. For further description of object oriented design and programming techniques see "Object-oriented Software Construction" by Bertrand Meyer, Prentice-Hall 1988.

In object oriented distributed systems based upon the client-server model, there exist servers that provide object oriented interfaces to their clients. These servers support objects consisting of data and the associated program instructions. Clients may obtain access to these objects and may execute calls on them. These calls are transmitted to the server from the client. At the server these calls are executed via the software associated with the object. The results of these calls are then transmitted back to the client.

Client applications or programs refer to particular objects by means of object handles or object names. An object name is used to locate an object (the "target object") so that calls may be executed on it. Client programs are typically provided with object names by other programs or inherit them at program initiation. If a given client program has an object name for a particular object then that client program can pass a copy of that object name to another client program. The second client program can then use the object name to access the object. Clients do not have information about the location of the object or the object's implementation which may be on some computer anywhere in the distributed computer system. The client's call to the object by means of the object's name is enabled by a "Naming or Directory Service."

A Naming or Directory service is a fundamental facility in any computing system. It is the means by which names are associated with objects, and by which objects are found given their names. The naming service provides operations for:

associating (binding) names to objects resolving (looking up) names to objects removing bindings, listing names, renaming, etc.

In addition to these basic naming operations, the service can also provide operations for dealing with attributes:

examining attributes associated with named objects modifying attributes associated with named objects searching for objects using attributes, etc.

In traditional systems, a naming service is seldom a separate service. It is usually integrated with another service, such as a file system, database, desktop,etc. For example, a file system includes a naming service for files and directories; and a spreadsheet has a naming service for cells and macros.

In a large distributed computing environment, there are typically many disparate naming systems that can either be accessed separately or cooperatively to resolve composite names. A "composite name" is a name that spans multiple naming systems. It consists of an ordered list of zero or more components. Each component is a string name from the name space of a single naming system. Moreover, a system has been developed for a protocol and process for combining names from disparate naming systems into a "federated naming system" which can be implemented to facilitate resolution of "composite names". See U.S. Pat. No. 5,377,323 issued Dec. 27, 1994 to Rangaswamy Vasudevan titled "Apparatus and Method for a Federated Naming System which Can Resolve a Composite Name Composed of Names from Any Number of Disparate Naming Systems" which is incorporated fully herein by reference. X/Open, an independent, worldwide, open systems organization supported by most of the world's largest information systems suppliers, user organizations and software companies have adopted a standard defined way for clients (application programs) to access what is known as "federated naming systems." See the Preliminary Specification titled "Federated Naming: The XFN Specification" July 1994, X/Open Company Limited, ISBN: 1-85912-045-8 which is incorporated fully herein by reference. Federated Naming consists of a range of application program interfaces that include operations for resolving composite names to object references, binding composite names to object references, and listing naming contexts which contain name-to-reference bindings. In addition, the interfaces include operations for manipulating composite names and object references.

There must be a way for naming and directory service providers to incorporate their individual naming and directory operations into the federated naming system operations, and to allow new and arbitrary naming and directory systems to be made accessible to applications at run-time, without requiring recompilation of applications, re-linking or having to stop the application.

For example, while the interfaces defined in the X/Open XFN specification greatly simplify client programs that need composite and individual access to autonomous naming and directory systems, it is still difficult for naming or directory service provider programs to incorporate their respective services in the naming federation. That is, the operations for the federated naming system make it relatively straightforward for the client program to use a command of the type "objectT=ctx→OpenLookup(name, &status)" to obtain a reference to the object named by the Composite Name "name" relative to the context "ctx". However at the present time, it is very difficult to integrate a new naming or directory service provider (for the purposes of the discussion to follow, the term naming service provider will be used in place of naming or directory service provider, without loss of generality) into an existing system. This frequently involves changing/modifying/augmenting the individual existing naming service provider programs. That is, the modifications have not been straightforward to accomplish the tasks related to responding to a command of the type "objectT=ctx→OpenLookup(name, &status)" wherein the naming service provider program must return an object reference bound to head(name) in context ctx if "name" is an atomic name , and otherwise must return an object reference to a next context (say context cty) by returning head(cty) and a tail(name-cty). This problem is even more difficult if the incorporation of these modifications into the naming service provider has to be achieved without requiring that client applications be recompiled, or without requiring that client applications be stopped and restarted whenever a naming service provider program for a new naming service needs to be called as a result of the operations required to process a command of the type "objectT=ctx→OpenLookup(name, &status)".

The prior art does not define a uniform method for service provider programs to incorporate arbitrary naming and directory systems so that clients may automatically access them either individually or compositely. A CD-ROM entitled "The 1994 Solaris Developer Conference" created by SunSoft, a Sun Microsystems, Inc. company and dated April 1994 was distributed at a Sun Developers Conference in San Francisco, April 5–7, 1994. This CD-ROM included a number of demonstration binary programs and a paper in postscript form, entitled "Federated Naming Service" by SunSoft dated April 1994. This "Federated Naming Service" paper is fully incorporated herein by reference. This paper described the Federated Naming system and related problems as summarized above and in addition, in Chapter 5, the paper described a Service Provider Framework that supports the federation of Federated Naming System-conformant naming services in Solaris. Solaris is the Operating System Environment product produced and sold by Sun Microsystems, Inc. This chapter 5 described the framework, how implementors could use the framework to federate existing and new naming services, and how implementors could use a toolkit described therein to alleviate the task of federated naming services. Unfortunately, the mechanisms defined in this paper did not address the fact that naming systems within a federation have different ways of indicating where the boundaries between naming systems are. There was no way to indicate how names from different naming systems within a federation are syntactically separated within a composite name, effectively identifying where the naming system boundaries lie. The present invention provides an improved Federated Naming Framework mechanism wherein strong and weak separation are defined and mechanisms provided to determine where these naming system boundaries are.

Accordingly, the present invention defines a system and method for allowing a developer/maintainer to integrate disparate naming service provider programs into an existing system so that clients can access the newly integrated naming or directory service automatically and without having to be disrupted.

SUMMARY OF THE INVENTION

The present invention overcomes the problems of implementing naming service providers into an existing distributed computing system as required by federated naming system operations wherein naming system boundaries are not defined. A system and method are disclosed to simplify the way in which naming service providers incorporate their individual naming and directory operations into the federated naming system operations; and allow new and arbitrary naming and directory services to be made accessible to applications at run-time, without requiring re-compilation, re-linking or having to stop the application, in other words, without disruption; and to provide naming system mechanisms configured to indicate support for strong or weak separation in their respective naming systems.

The present invention allows incorporation of a naming service at the level of composite naming or atomic naming to suit the service provider's needs. The method and apparatus also include a way to identify and invoke the appropriate naming or directory service provider implementation at run-time. This means that an application may have the benefit of traversing multiple disparate naming systems at run-time without a-priori knowledge of their existence or location. The dynamic capability of the apparatus further allows for arbitrary naming service providers to be incorporated and thus be made accessible without the application having to be disrupted.

In one aspect of the present invention, a Federated Naming Framework System is disclosed for use in a distributed computing system. The Federated Naming Framework System includes a federated naming framework mechanism which acts as the intermediate layer between the client application and the one or more naming services that need to be federated, and which includes one or more naming service mechanisms configured to indicate support for strong or weak separation in their respective naming systems.

In another aspect of the present invention, the Federated Naming Framework System also includes a naming service provider interface configured to communicate with one or more naming service providers.

In yet another aspect of the invention, a method is disclosed for providing a mechanism to permit naming service providers to be added to an existing system without disruption of the existing clients.

In still another aspect of the invention, a computer program product having a computer usable medium which contains computer readable code mechanisms embodied therein is disclosed, which computer readable code mechanisms include a Federated Naming Framework System which includes a federated naming framework mechanism which acts as the intermediate layer between the client application and the one or more naming services that need to be federated, and which includes one or more naming service mechanisms configured to indicate support for strong or weak separation in their respective naming systems.

DESCRIPTION OF THE DRAWINGS

The objects, features and advantages of the system of the present invention will be apparent from the following description in which.

NOTATIONS AND NOMENCLATURE

Figure 1:
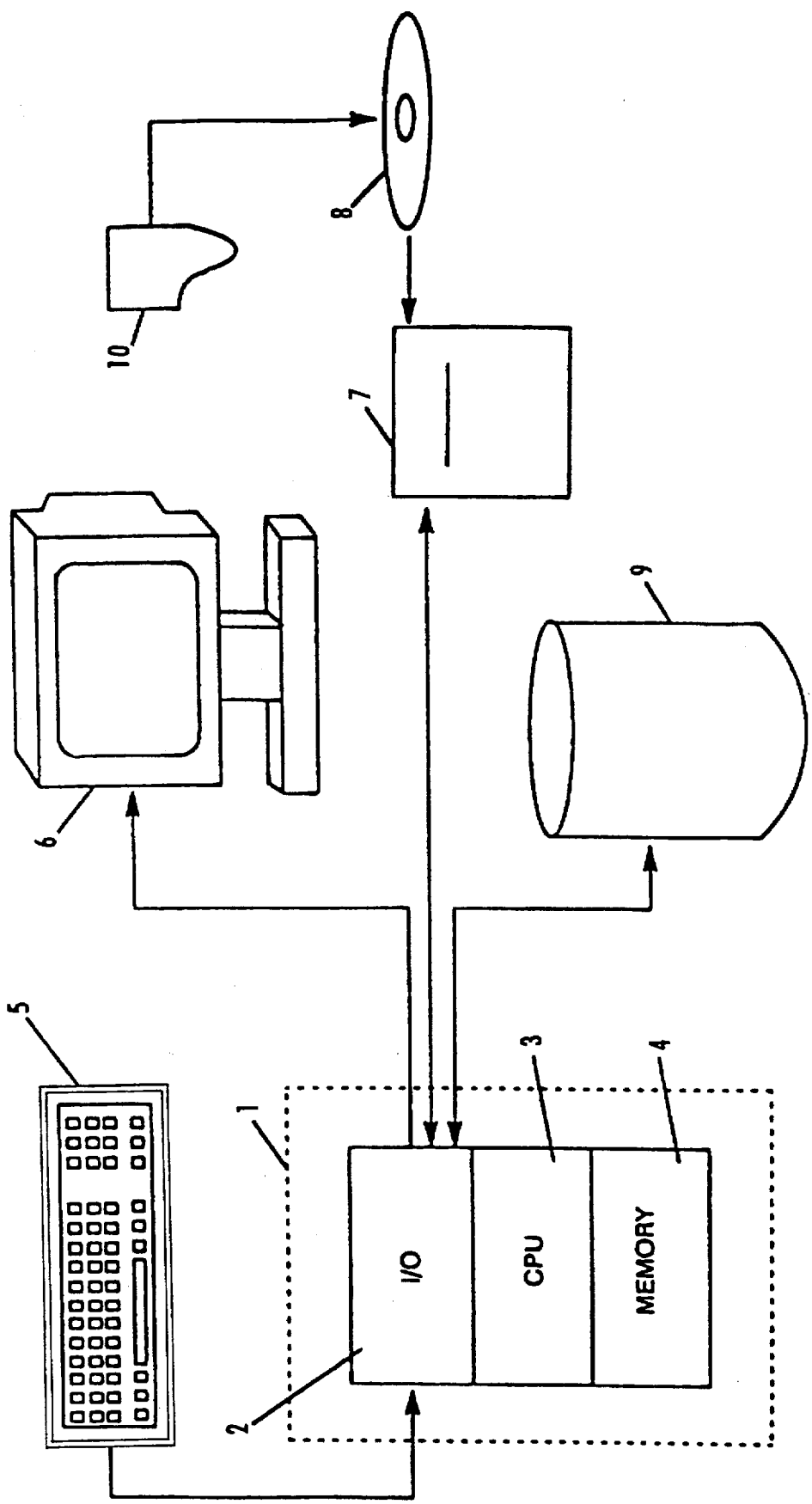
FIG. 1 illustrates a typical computer workstation of the type used in conjunction with the current invention.

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be bourne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices. In all cases there should be bourne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

A system and method are disclosed for incorporating arbitrary naming services into a naming federation in a distributed computing system. In the following description, for purposes of explanation, specific data and configurations are set forth in order to provide a thorough understanding of the present invention. The preferred embodiment described herein is implemented for use in the Solaris™ Operating System created by Sun Microsystems®,Inc. (Solaris is a trademark, and Sun Microsystems is a registered trademark of Sun Microsystems, Inc.) However, it will be apparent to one skilled in the art that the present invention may be practiced without the specific details and may be implemented in various computer systems and in various configurations, or makes or models of tightly-coupled processors or in various configurations of loosely-coupled multiprocessor systems.

The present invention is a system and method for a Federated Naming Framework ("FN Framework") system, which includes a set of standardized Federated Naming Service Provider Interfaces ("FN SPIs"). The present invention allows incorporation of a naming service at different levels ranging from composite naming to atomic naming to suit the service provider's needs. The method and apparatus also includes a way to identify and invoke the appropriate naming service provider implementation at run-time. This means that an application may have the benefit of traversing multiple disparate naming systems at run-time without a-priori knowledge of their existence or location. The dynamic nature of the apparatus and method allows for arbitrary naming service providers to be incorporated and thus be made accessible without the application having to be disrupted.

Operating Environment

Figure 2:
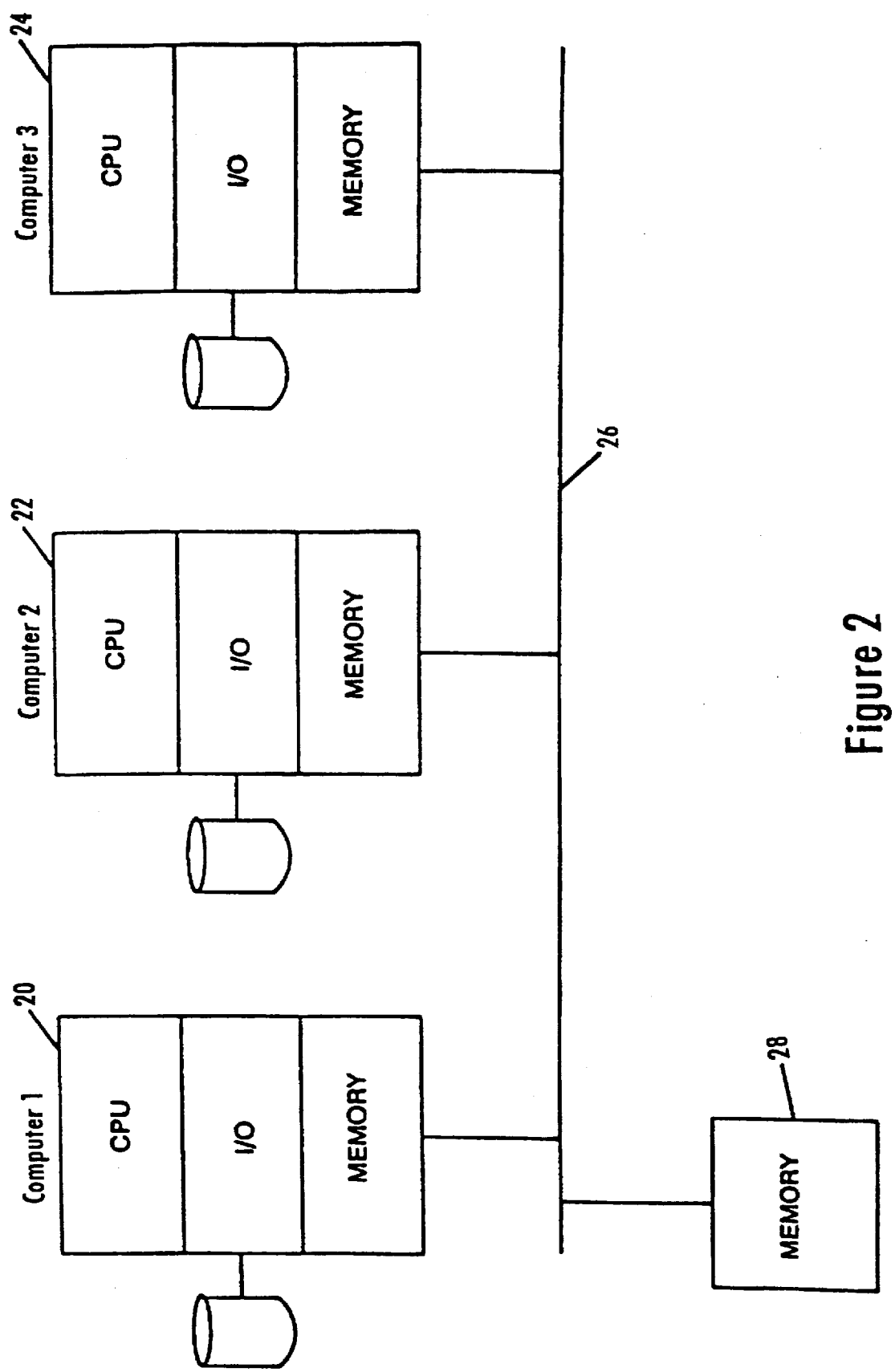
FIG. 2 illustrates a typical configuration of a distributed computer system for use in conjunction with the current invention.
Figure 3:
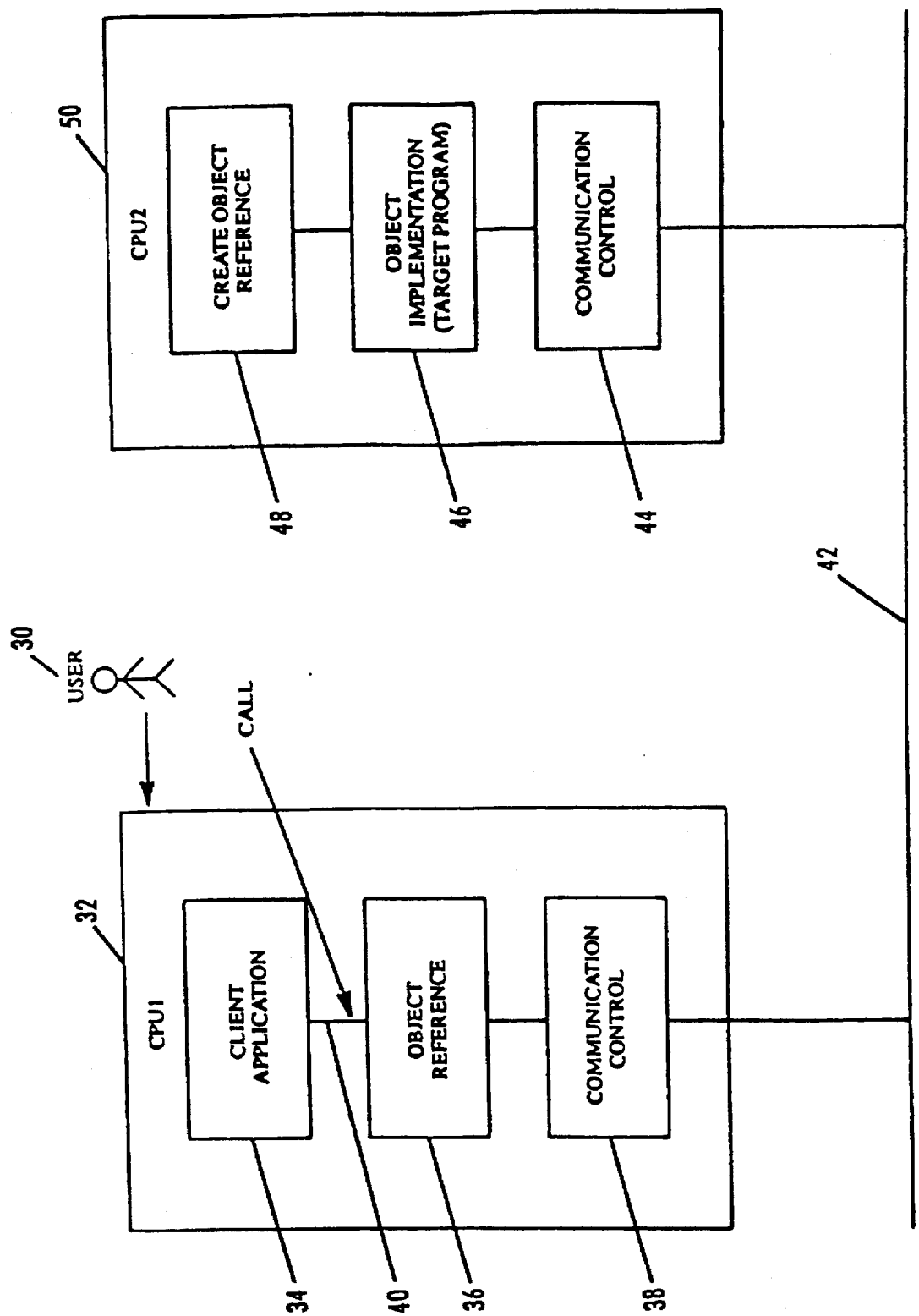
FIG. 3 illustrates a typical client-server relationship in a distributed system.
Figure 4:
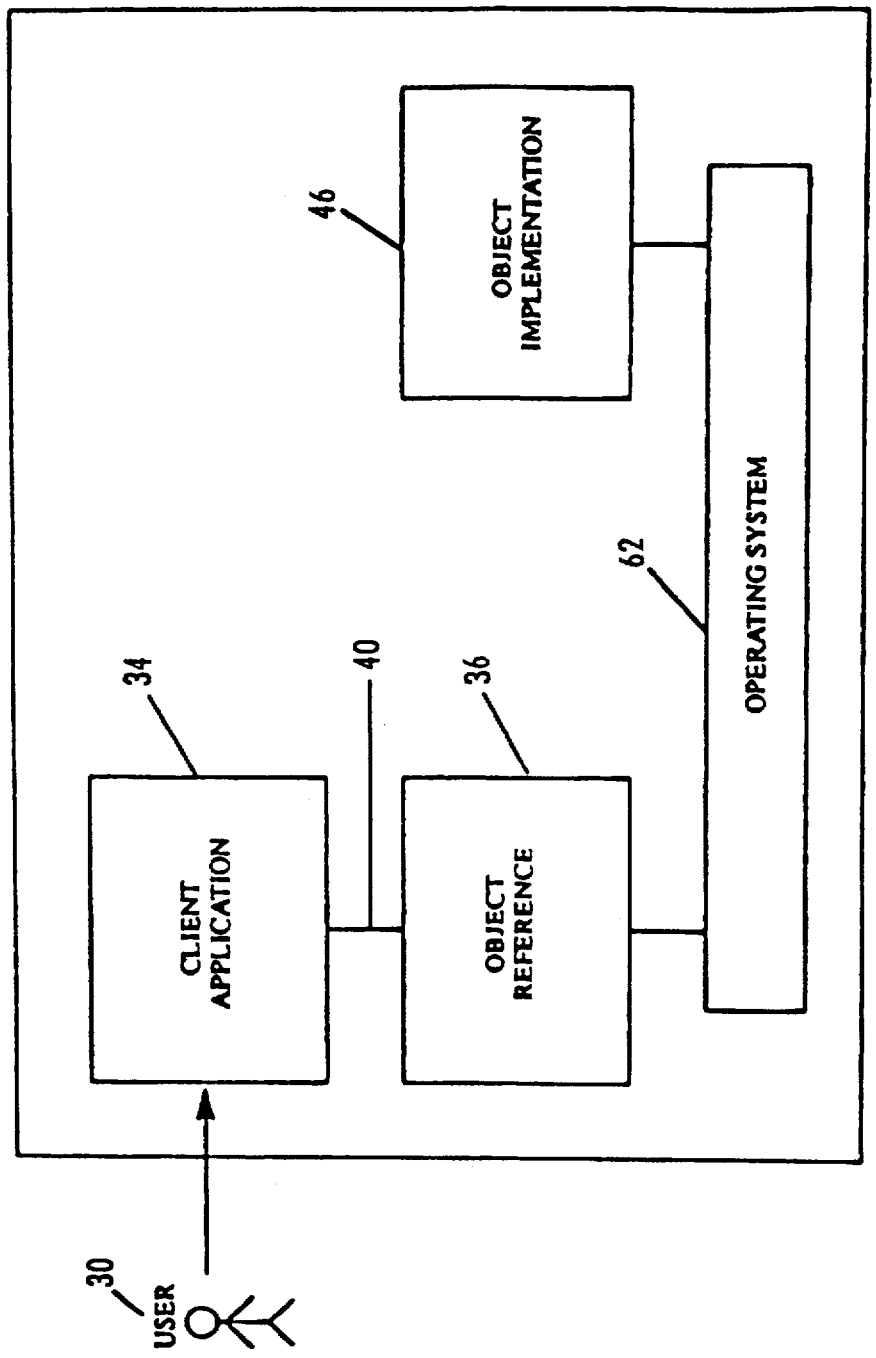
FIG. 4 illustrates a typical client-server relationship in a common host system.

The environment in which the present invention is used encompasses the general distributed computing system, wherein general purpose computers, workstations, or personal computers are connected via communication links of various types, in a client-server arrangement, wherein programs and data, many in the form of objects, are made available by various members of the system for execution and access by other members of the system. Some of the elements of a general purpose workstation computer are shown in FIG. 1, wherein a processor 1 is shown, having an Input/output ("I/O") section 2, a central processing unit ("CPU") 3 and a memory section 4. The I/O section 2 is connected to a keyboard 5, a display unit 6, a disk storage unit 9 and a CD-ROM drive unit 7. The CD-ROM unit 7 can read a CD-ROM medium 8 which typically contains programs 10 and data. The computer program products containing mechanisms to effectuate the apparatus and methods of the present invention may reside in the memory section 4, or on a disk storage unit 9, or on the CD-ROM 8 of such a system. FIG. 2 illustrates a typical multi-processor distributed computer system wherein independent computers 20, 22 and 24 are connected to each other and possibly to a shared memory unit 28 via a communication link 26. FIG. 3 illustrates a typical object oriented, client server arrangement, wherein a user 30 can initiate a client application 34 on a first computer 32. The client application 34 places a call 40 on an object reference 36 which points to an implementation of the object (also referred to as the "target object") 46 on a second computer (the server) 50. The call 40 is passed to the communication control mechanism 38 which sends the call to the server 50 on which the object implementation 46 is located. This object implementation mechanism 46 originally creates the object reference 36 and makes it available to users, usually when the object implementation is first created. Upon completion of processing the call, the object implementation 46 will return a message or the results of a desired operation via the communication link 42 to the originating client application 34. This client-server model may also function in a single processor unit wherein the communications mechanism functions are performed by the operating system (62 in FIG. 4).

Background on Federated Naming and Definitions

The salient federated naming system concepts that are germane to this invention are: Every name is generated by a set of syntactic rules called a naming convention. An atomic name is an indivisible component sequence of one or more characters defined by a naming convention. A naming convention defines all possible atomic names. A compound name is a sequence of one or more atomic names. A composite name is a sequence of one or more compound names. Each compound name belongs to a different naming system.

A context is an object that contains a set of bindings with distinct atomic names. Every context has an associated naming convention. A context provides a lookup (resolve) operation that returns the reference to an object. It may also provide operations that bind names, unbind names, change names, list bound names, examine and manipulate attributes associated with named objects, etc.

A naming system is a connected set of contexts of the same type (having the same naming convention) and providing the same set of operation with identicle semantics.

A federated naming system is a set of autonomous naming systems that cooperate through a standard interface to implement name resolution of composite names. Thus, a federated naming system is a connected set of contexts spanning more than one naming system. The connection between two naming systems in a federation can be expressed and implemented using the notion of a next naming system pointer. A next naming system pointer contains reference information on how to reach the next naming system in the federation.

Naming systems within a federation are separated by naming system boundaries. Composite names are used to name objects in a federated naming system. The terms strong separation and weak separation are used to describe how names from different naming systems within a federation are syntactically separated within a composite name, effectively, identifying where the naming system boundaries lie. In strong separation, the composite component name separator is used to indicate the naming system boundary. In weak separation, the composite component name separator does not necessarily indicate a naming system boundary; the naming system boundary is determined dynamically as resolution proceeds (wherein we speak of dynamic weak separation), or statically through the use of syntactic rules particular to a naming system (which is referred to as static weak separation). Strong and weak separation are properties of a particular naming system. Strongly and weakly separated naming systems may co-exist within a single federation.

Figure 5:
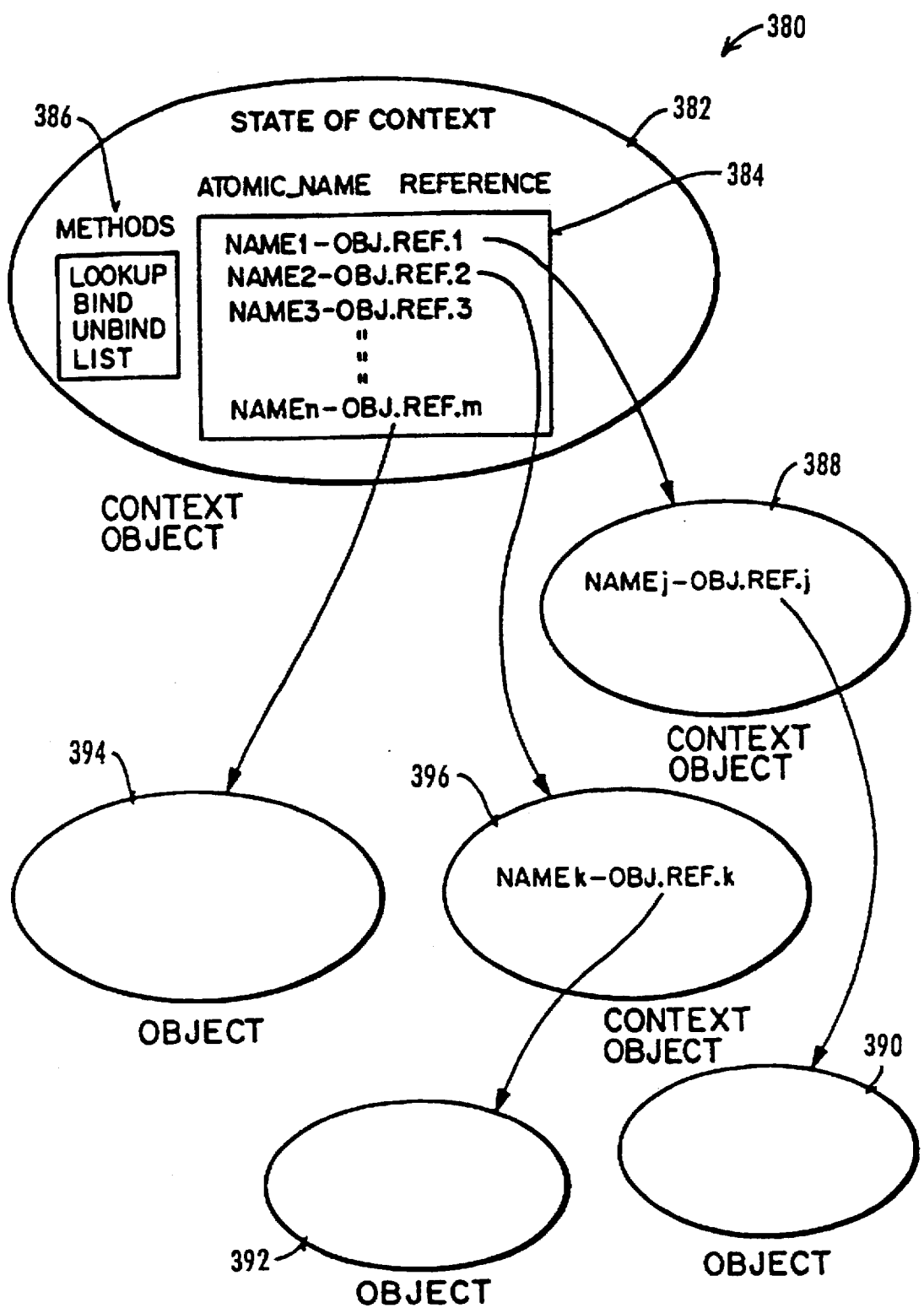
FIG. 5 illustrates a context object.

Naming Context Since this concept of a naming context is fundamental to the general idea of naming systems, several different views of the concept of context will now be illustrated. Referring now to FIG. 5, a context object is depicted. Context object 382 is shown, containing various methods 386 and a state 384 which comprises a list of names which are bound to object references. The object references may point to an object such as object 394, or they may point to other context objects 388, 396 which themselves have similar operations (methods) and state containing names bound to other references, for example, such as those in context object 396 pointing to object 392, and those in context object 388 pointing to object 390. It should be understood that these objects 394, 392, and 390 are implementations of the objects whose locations are indicated by the references bound to the object names.

Figure 6:
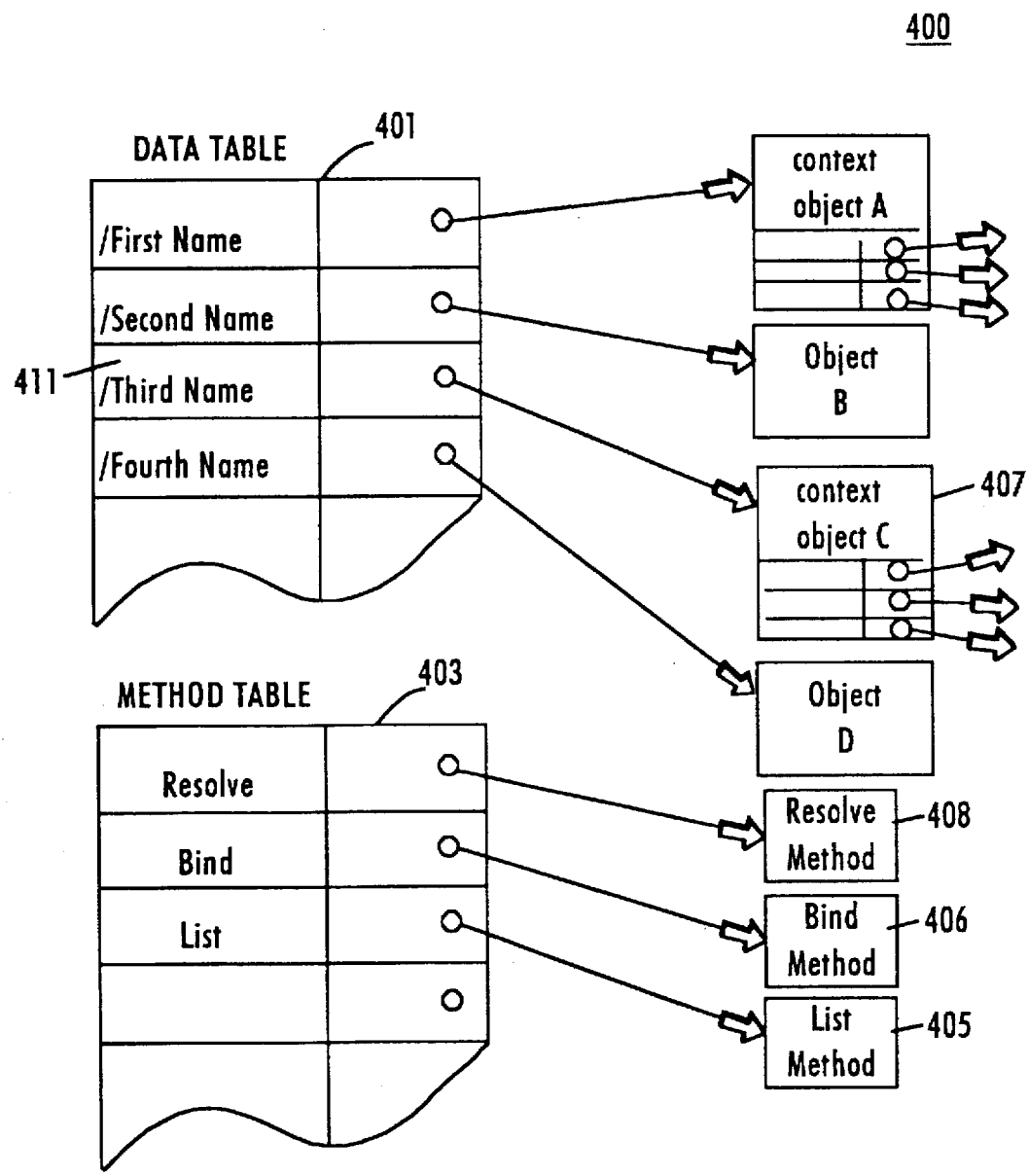
FIG. 6 illustrates an alternate view of a context object.

Referring now to FIG. 6 an alternate view of a context object is depicted 400. The context object 400 contains a table 401 which maintains a set of name-to-object reference associations (also called name bindings). In the preferred embodiment, names have meaning only in the context in which they are used. Thus an object reference may be bound to several different names in several different context objects at the same time. A client of a typical naming service performs naming operations via methods identified in a method table 403 of the context object 400. In the preferred embodiment, for example, a context object has methods to lookup 408 the name of an object, which means to look up the object reference bound to the given name within a context; to bind 406 a name to an object, thereby associating a name with the reference of an object; to list 405 the names and associated references; etc.

As indicated in FIG. 5, context objects may point to other context objects; that is, a name in one context object may be bound to the reference of a second context object. Binding one context object within another context object creates a naming graph, which is a directed graph with nodes and labeled edges, where the nodes with outgoing edges are contexts. When an edge leads to a context in another naming system, this creates a naming graph that spans multiple naming systems. In other words, name space composition, or the creation of a federated name space, in which one name space is attached to another name space, has occurred.

Naming Service Providers

Figure 7:
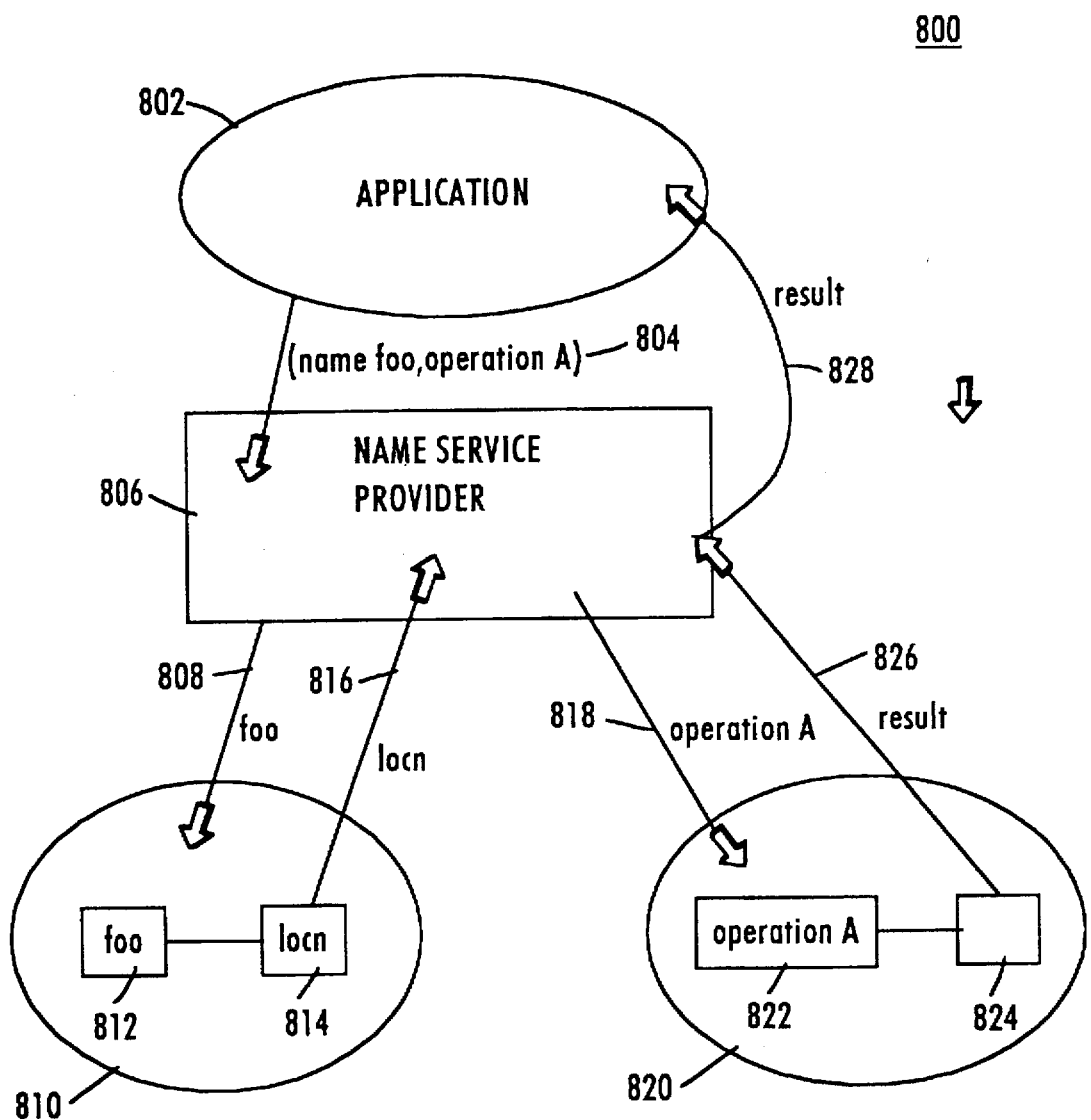
FIG. 7 illustrates a functional relationship of a typical naming service provider to a client.

Different naming systems use different mechanisms to bind context objects together and to map object names to the appropriate object implementation. The mechanisms used to provide the interface between a client and this naming structure is the Naming Service Provider. In FIG. 7 a functional relationship 800 between these elements is shown. The application (client) 802 typically executes a call on a context object. This call 804 contains a name, the operation to perform, and one or more additional parameters required by the operation, for example "name foo, operation A". Assume for this example that foo is an atomic name and that the operation is to be effected on the context object named by foo. [If the operation is to be performed on the penultimate context (such as is the case for operations like bind) rather than the context named by foo, then there would be slight variations to the following description. Namely, the operation A would be performed by context object 810 rather than 820.] The call 804 is typically directed to the Naming Service Provider 806 which first locates the context object supplied. It then passes "name foo, operation A" 808 to that context object 810. The context object 810 tries to map the object name foo into the table 812 bound to the reference locn 814 and returns it 816 to the Naming Service Provider 806. The Naming Service Provider 806 then uses the reference locn 816 to generate a pointer to the address of the implementation 820 of the object foo and gives it the operation A 818. The context implementation 820 performs the method 824 corresponding to operation A 822 and returns a result 826 to the Naming service Provider 806, which passes the result 828 to the calling client 802 thereby completing the original operation call request. Other embodiments provide for the context implementation 820 to return any results of the called operation directly to the calling client application 802. It will be recognized by those skilled in these arts that the Naming Service Provider 806 may manage significantly more activities if there are multiple context objects involved in the mapping of the original name to the location of the implementation.

Figure 8:
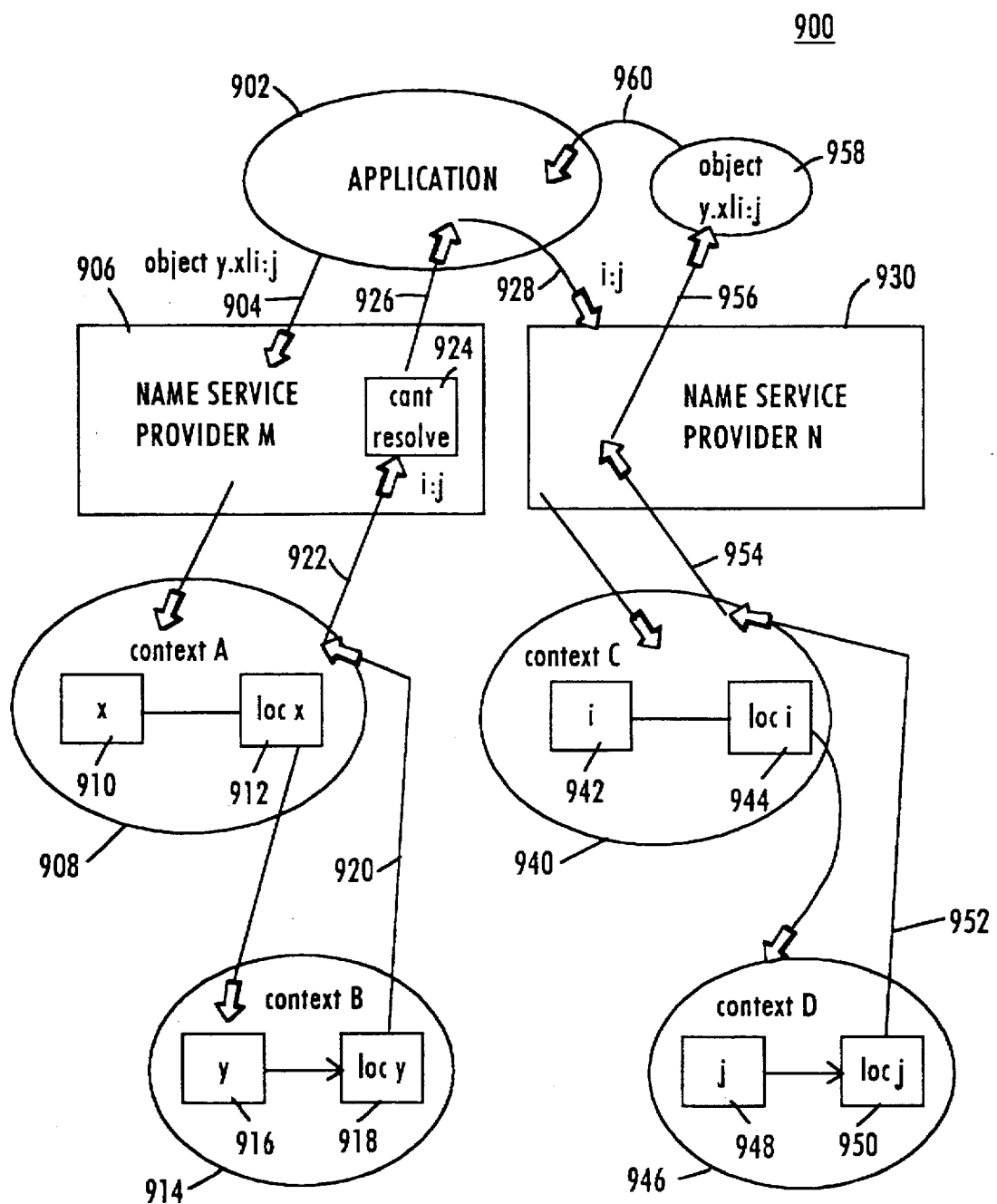
FIG. 8 illustrates a system having multiple naming service providers.

A more complex situation arises where multiple Naming Service Providers are involved. This is a case where a composite name spans multiple naming systems. Consider the example shown in FIG. 8. The system 900 illustrated in FIG. 8 shows a system wherein the client application 902 issues a call on an object having a composite name yx/i:j 904 to Naming Service Provider M 906. The composite name yx/i:j consists of two components, yx and i:j; the first component yx is a compound name from a name space that has a right-to-left, dot-separated name syntax, while the second component i:j is a compound name from a name space that has a left-to-right, colon-separated name syntax.

This Naming Service Provider M 906 attempts to resolve the name yx/i:j through context object A 908 wherein the name portion x 910 is resolved to the reference 912, which points to context object B 914. In context object B 914, the name portion y 916 is resolved to an entry 918, which is a reference to a context in another naming system. Because Naming Service Providers can only deal with contexts within the same naming system, context object B 914 sends a response 920 to context object A 908 and thence 922 to Naming Service Provider M 906 which says 924 "I cannot resolve the rest of the name (i:j)." In this case the Naming Service Provider M 906 does not know about Naming Service Provider N 930 and so must return a message 926 to the client application 902 which says "I cannot resolve the name of the object you requested." If the Client 902 knows to call the second Naming Service Provider N 930, a call can be made to resolve the remainder of the composite name i:j 928. In this example, the second Naming Service Provider N 930 knows how to resolve the balance of the name and the called objects implementation 958 is ultimately called and the call ends successfully.

In the example described above in FIG. 8, the Client 902 must be modified whenever it is necessary to add another Naming Service Provider to the system. It had to know to invoke Naming Service Provider N 930 to resolve the rest of the name i:j. As other Naming Service Providers are added, the Client needs to be modified to know about them. Furthermore, the Client 902 is also administering the calls to the different Naming Service Providers. It is more desirable that the Client applications and their programmers do not have to deal with handling and administering these different Naming Service Providers. It is this problem that is addressed by the present invention.

Overview of Present Invention

Following the definitions given for the different forms of names—atomic, compound and composite—described earlier in the Background section, the present invention provides a Federated Naming Service Provider Interface (FN SPI) for four (4) types (Atomic Name, Compound Name, Partial Composite Name and Composite Name), along with a mechanism, designated the Federated Naming Framework (FN Framework), which is present between these interfaces and clients, to support the translation and administration of calls for resolution of composite names. This allows client applications using the Federated Naming API to make appropriate use of the available FN SPIs (there may be more than one FN SPI in any given system). The present invention allows system implementors to install new naming services dynamically without disruption of the client applications.

Figure 9:
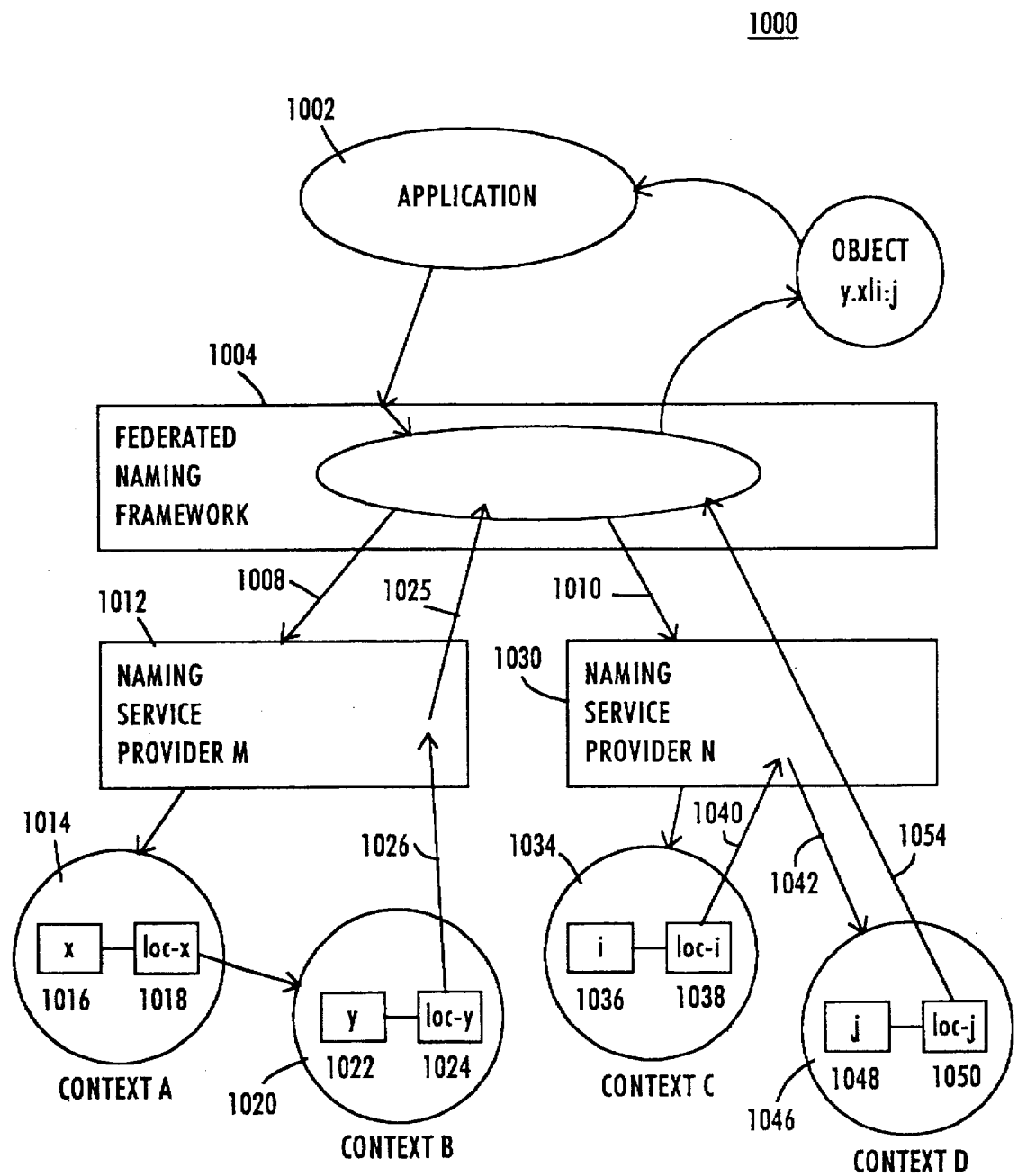
FIG. 9 illustrates a structure for a system having multiple naming service providers according to the present invention.

One view of the present invention is shown in FIG. 9. FIG. 9 indicates a system 1000 showing the system of FIG. 8 as handled by the FN Framework 1004. In system 1000 the FN Framework 1004 is located between the client application 1002 and the Naming Service Providers 1012, 1030 and performs all of the functions necessary to resolve composite names which require partial resolutions from both Naming Service Providers 1012, 1030. It will be clear to those skilled in these arts that a FN Framework 1004 which is capable of interfacing with multiple Naming Service Providers through FN SPIs would provide significant utility to systems implementing a federated naming system comprising multiple disparate naming services.

DETAILS OF THE PRESENT INVENTION

A. Architecture

The invention takes advantage of the fact that naming context is the fundamental naming concept. Associated with each named context object is an implementation for it—this is referred to as the context implementation. Each context implementation provides operations (like lookup, bind, associating attributes and examining them, etc) functionally equivalent to those in the context interface (see U.S. Pat. No. 5,377,323 described above). The context implementation makes these operations available through a Federated Naming Service Provider Interface (FN SPI), which is a contract between the FN Framework and the context implementation. There are four kinds of FN SPIs, depending on the capabilities of the context implementation, so that different naming service needs are properly satisfied. The four kinds of FN SPIs are:

Composite Name SPI,

Partial Composite Name SPI,

Compound Name SPI,

Atomic Name SPI.

Operations involving composite names require composite name resolution. The FN Framework enables composite name resolution through different contexts, possibly through different naming systems, by using the context implementations associated with each context involved. Association between a name and its context handle is done in the following manner. The FN API supplies an operation (OpenLookup) which returns the reference bound to a name. Each FN SPI contains a constructors operation, which the FN Framework invokes (for each context implementation) in order to get a context handle to the context (object handles and constructors are described in the aforementioned text "Object-Oriented Software Construction" by Betrand Meyer, Prentice-Hall, 1988). Using this reference, the FN Framework loads in the context implementation associated with the reference and invokes the constructors operation from it. At this point, the FN Framework has a context handle to a context object. The FN Framework manages composite name resolution by alternatively resolving component(s) from the composite name and then obtaining a context handle to the context object named by the component(s). Eventually, all the components of the composite name are consumed and the target context upon which the target operation is to take place is reached. The FN Framework then invokes the target operation on the target context (with arguments appropriate for that operation) and returns the results of the invocation to the client application.

In the preferred embodiment, the following illustrates a code fragment of how the constructor might be called:

```
ctx=constructor(reference);
``` where ctx is a handle to a context object reference is a reference obtained by looking up a name. (this is discussed in more detail in Section Context Implementation Linkage below).

The following discussion will describe the three key components of this invention:

the FN SPI, the FN Framework, context implementation linkage.

B. The Federated Naming Service Provider Interface

The Federated Naming Service Provider Interface (FN SPI) provides a simplified way for naming and directory service providers to incorporate their naming and directory operations into the federated naming system operations. Naming service providers are insulated from knowledge about other naming service providers on the same system and only need to supply operations defined in the SPI that they are using.

As described above, each FN SPI contains a constructors operation that each context implementation must supply.

Each operation in the FN SPI has a status argument that is set by the context implementation. All context implementations set the status argument in the following way. If the operation is to be continued by the FN Framework, the context implementation must set the status (or status code) to CONTINUE and set the following two fields of the status object as follows:

rref (the resolved reference field) is a reference to the context in which to continue the operation.

rname (the remaining name field) is set to the name to be processed in the context pointed to by rref.

This information allows the FN Framework to continue processing of the composite name to completion.

The following describes each of the four kinds of FN SPIs.

Composite Name SPI

Naming service providers that want to handle complete composite name resolution should provide the Composite Name SPI. The context implementation provides an implementation for the context interface (ctx_lookup(), ctx_bind (), ctx_unbind(), and so on) directly and must be able to handle complete composite name resolution, across any naming system boundary and return the answer to the client.

Partial Composite Name SPI

The Composite Name SPI required the underlying context implementation provider to carry its operations to their conclusion, even if that involves recursive evaluation. The recursive model is a convenient one for the client, but recursive evaluation is not always desirable or even possible. Naming service providers that want to only resolve a composite name partially should provide the Partial Composite Name SPI.

Context implementations that offer the Partial Composite Name SPI provide implementations for operations on partial composite names. Such context implementations are not required to handle a composite name in its entirety. Any remaining unused components of the composite name are returned by the context implementation along with status information indicating how the operation should be continued to the FN Framework. The FN Framework (described in detail below) then interprets this status information and invokes the next Naming Service Provider to continue the operation.

Figure 11:
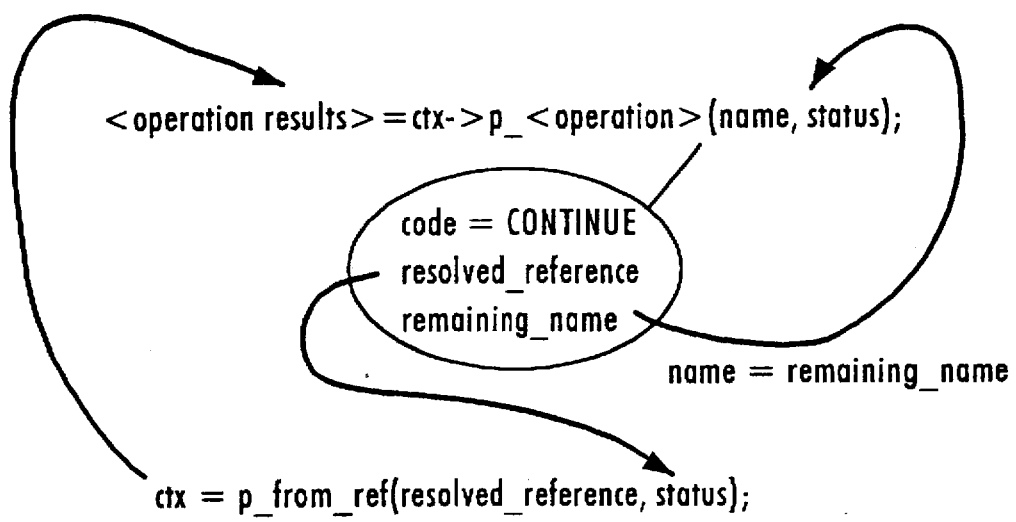
FIG. 11 illustrates how the Federated Naming (FN) Framework implements the context interface using the Partial Composite SPI.

The Partial Composite Name SPI defines a set of operations (p_lookup(), p_list_names() etc.) mirroring the operations in the context interface to be used by the FN Framework. FIG. 11 depicts an exemplary Partial Composite Name Resolution. Operations with the "p_" prefix (e.g. p_lookup()) are invoked on a context ctx, and take as input a composite name, name, and returns <operation results> and status. If a p_operation did not complete the operation and require that the operation be continued in another context, it sets the status object with the following information:

set status code to CONTINUE, to indicate that the operation is to be continued set the remaining name part (rname) in status to be part of name that needs further processing set the resolved reference part (rref) in status to be the reference of the name resolved thus far.

This status information is returned by the context implementation to the FN Framework, which updates the name argument to be rname, and updates ctx to be the context handle of the context identified by rref. The updated name and ctx arguments are then used to continue the p_operation. (This is described in more detail during the discussion of the FN Framework below). If the p_operation need not be continued (either ended successfully or failed), the results are returned to the client application.

Compound Name SPI

The Partial Composite Name SPI required the underlying context implementation to deal with composite names that involve names from more than one naming system. Naming Service Providers that only can deal with names from a single naming system should provide the Compound Name SPI.

The Compound Name SPI is designed for Naming service providers that only want to deal with names from a single naming system. Like the Partial Composite Name SPI, the Compound Name SPI defines a set of operations (c_lookup (), c_listnames(), etc) mirroring the context operations, except that the operations in the Compound Name SPI operate on compound names.

For context implementations that support static weak separation, the implementation must supply an additional operation for determining which initial components of the input name belong to the naming system. The rest of the components unused by the naming system are returned in another parameter to the operation. In the preferred embodiment this operation is referred to as p_component_parser(). The following code fragment illustrates how it might be called.

```
compound_name=ctx→p_component_parser(name,&rest,&pstatus);
``` where name is the composite name to be broken up, compound_name is the initial components of the composite name, name, that are to be processed by the contexts of this naming system, rest is the components of name to be left for the next naming system, if any, and pstatus is a status parameter which indicated the execution status of the p_component_parser() implementation.

For example, suppose a context supports static weak separation using a syntactic policy that each component belonging to its name space must have an equal ('=') character in it. This context implementation supplies an implementation for p__Component__parser() that, when supplied with a composite name such a=b/c=d/e/f/g:

```
compound_name=ctx→p__component_parser("a=b/c=d/e/f/g",
    &rest, &pstatus); returns in compound_name "a=b/c=d", and
    in rest, "e/f/g".
```

A terminal naming system cannot have any next naming system after it. Once an operation reaches this naming system, it does not enter into another naming system in the federation. When a naming system becomes a part of a federation of naming systems, unless it is a terminal naming system, it must support the notion of being used as an intermediate naming system for resolution of composite names. That means it must provide a mechanism for the root of other name spaces to be bound and looked up. In the preferred embodiment of this invention, this mechanism is referred to as the next naming system pointer. Different naming services have different ways of supporting the next naming system pointer. For example, one naming system might support next naming system pointers by giving them special names and storing them within the same naming system, while another component naming system might have a separate service that deals especially with next naming system pointers.

Figure 12:
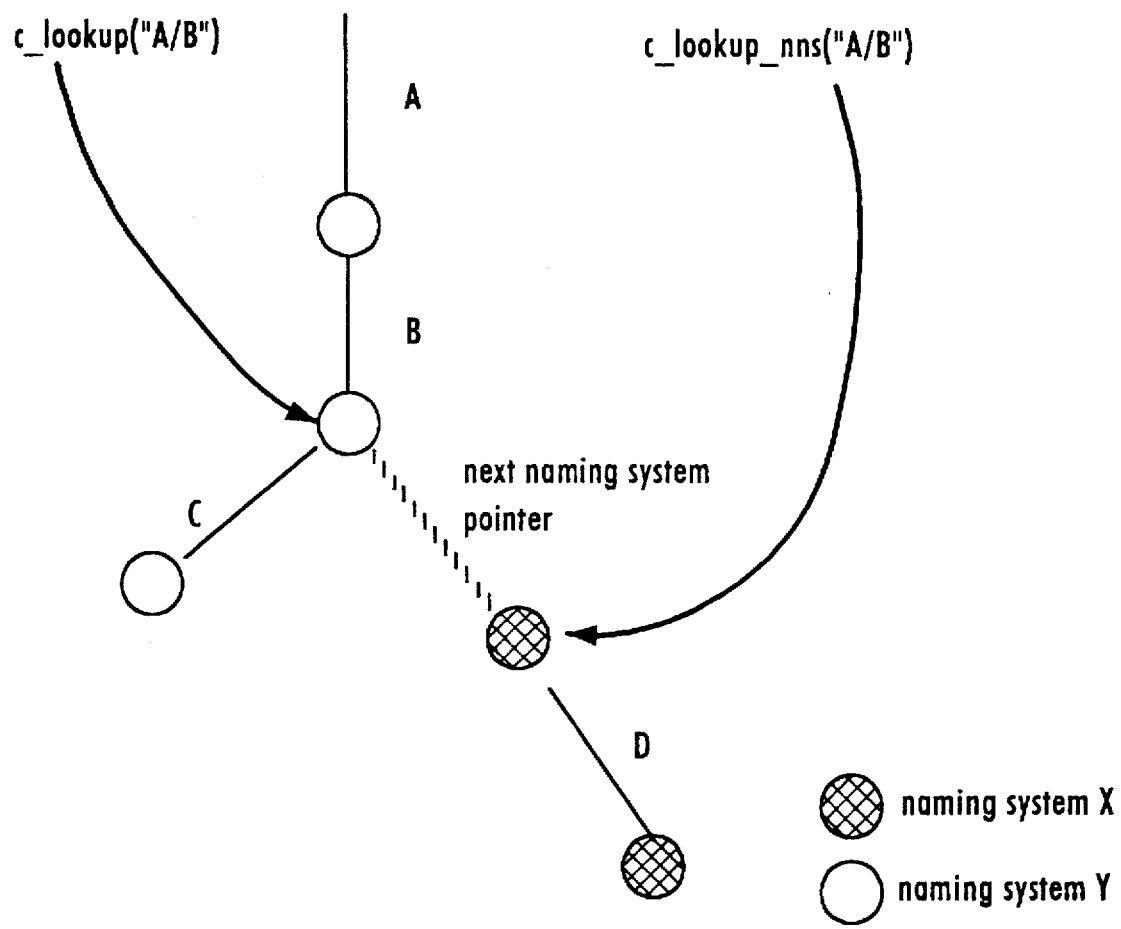
FIG. 12 illustrates the use of compound names and the "next naming system" pointer.

In addition to the c__interfaces, the Compound Name SPI defines an additional set of operations (c__lookup__nns(), c__listnames__nns(), etc), mirroring the context operations, to manipulate the next name system pointer. These "nns" operations take a compound name as argument, but operate on the next naming system pointer associated with the name, rather than the name itself. FIG. 12 illustrates the difference between normal Compound Name SPI context operations and nns Compound Name SPI operations. A call to

```
ctx→c__lookup("A/B", &status)
``` results in the return of the reference bound to the compound name "A/B", whereas a call to

```
ctx→c__lookup_nns("A/B", &status)
``` results in the return of the reference bound to the next naming system pointer of "A/B".

Atomic Name SPI

The Compound Name SPI required contexts to deal with compound names. Naming Service Providers that only can deal with atomic names should provide the Atomic Name SPI. The Atomic Name SPI defines a set of operations (a__lookup(), a__listnames(), etc), mirroring the context operations, for operating on atomic names. In addition, the Atomic Name SPI also contains a set of operations for dealing with any next naming system pointer associated with the atomic name (a__lookup_nns(), a__listnames_nns(), etc).

The Naming Service Provider using an Atomic SPI deals with resolution within a single context which provides the basic building block for a hierarchical naming service. A context implementation that supplies the Atomic Name SPI provides implementations for operations on atomic names and any next naming system pointers associated with the atomic name.

A context implementation that supplies the atomic SPI expects its input name to be a single string, representing the name to be resolved or operated upon in the target context of a naming system. In other words, the input name cannot span more than one context.

A context implementation that supports strong separation (see earlier definitions) must supply an additional operation, c__component__parser(), for parsing a compound name into head/tail components using the naming convention for that particular naming system. (See U.S. Pat. No. 5,377,323, which is incorporated fully herein by reference, for a description of the protocol for parsing a compound name into head/tail components.) The input to c__component__parser() is the compound name, whose first component is to be resolved in the target context. The outputs are the first component, head, and the rest of the components, tail, returned in separate arguments. The following code fragment illustrates how it might be called.

```
head=ctx→c__component_parser(compound_name,&tail,&cstatus);
``` where compound_name is the compound name to be parsed, head is the first atomic name in compound_name according to the naming convention of this context, ctx.

tail is the ordered rest of the atomic names in compound_name excluding, head; and cstatus is a status indicating the success or failure of the c__component_parser() operation.

For example, suppose i:j:k is a compound name from a name space that has a left-to-right colon-separated name syntax. The context implementation for this naming system supplies an implementation for c__component_parser(). When the following is executed,

```
head=ctx→c__component_parser("i:j:k",&tail,&cstatus);
``` head will contain "i", while tail will contain "j:k".

A context implementation that supports static weak separation must supply a routine p__component_parser() (described above) for parsing a composite name into the initial compound_name and rest components.

How the FN Framework interacts with contexts that export the Atomic Name SPI is described in detail in the section THE FEDERATED NAMING FRAMEWORK.

Summary of SPIs

In summary, the alternatives for a Naming Service Provider to federate using the current invention are:

(1) Supply implementations for the operations in the Composite Name SPI for a composite name-aware naming service that is able to deal with any composite name in its entirety.

(2) Supply implementations for the operations in the Partial Composite Name SPI for a composite name-aware naming service that is able to deal with names from possibly more than one naming system but not necessarily to its entirety.

(3) Supply implementations for the operations in the Compound Name SPI for a naming service that is not composite name-aware. The implementation accepts a compound name and performs the context operation on it.

(4) Supply implementations for the operations in the Atomic Name SPI for an atomic naming service that is the building block of a hierarchical naming service. The implementation accepts an atomic name and performs the context operation on it.

C. THE FEDERATED NAMING FRAMEWORK

Figure 10:
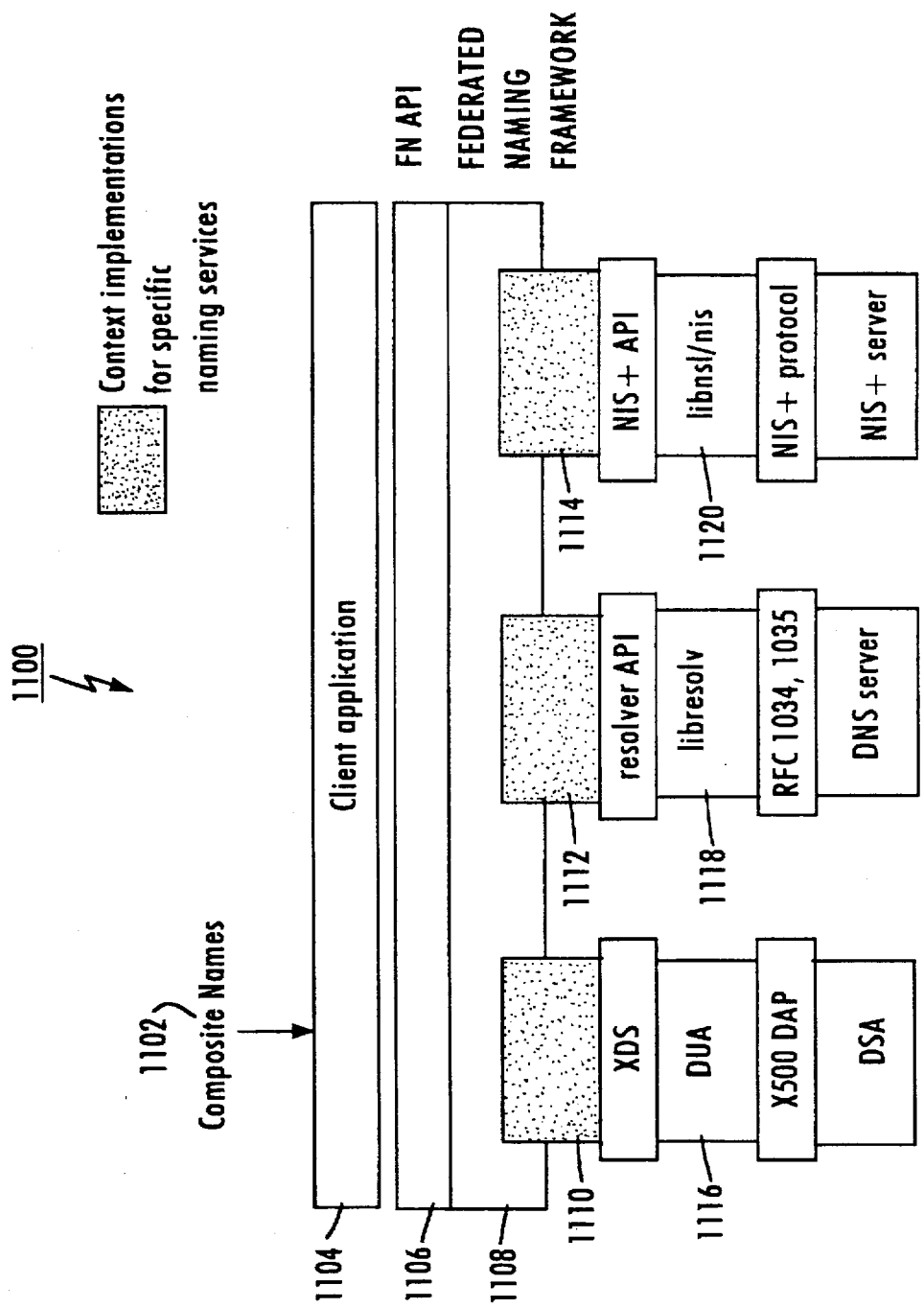
FIG. 10 illustrates another view of the present invention showing examples of contexts implementations for several different naming services.

The second major element of the present invention is the FN Framework shown as block 1108 in FIG. 10. It is this element which has as its objective to allow new and arbitrary naming and directory systems to be made accessible to applications at run-time, without requiring re-compilation, re-linking, or having to stop the application. As described below, the FN Framework provides the infrastructure into which the various FN SPI-conforming context implementations described above can be plugged, and provides the interface to client applications which can make the addition of a new naming service transparent to them.

The FN Framework allows for different implementations that supply different FN SPIs to exist at the same time on a client machine, thereby enabling a client application to access different members of a federation of naming services. An example of how the present invention is used is depicted in FIG. 10. In FIG. 10 the system 1100 comprises a client application layer 1104 which is capable of handling composite names 1102 and which interfaces with a Federated Naming Application Programming Interface ("FN API") layer 1106 which is located on top of a Federated Naming framework layer 1108 to which can be interfaced various context implementations for specific naming services 1110, 1112, 1114 each of which uses a designated FN SPI. The context implementation 1110 represents the mapping of an FN SPI to XDS, an interface for exclusively supporting the X.500 directory service 1116. This context implementation 1110 supports static weak separation and supplies the Compound Name SPI. Similarly, the context implementation 1112 represents the mapping of an FN SPI to the Internet DNS resolver API, an interface for exclusively supporting the Internet DNS. The context implementation 1112 supports strong separation and supplies the Compound Name SPI. And the context implementation 1114 represents the mapping of an FN SPI to the NIS+ API, an interface for exclusively supporting NIS+. The context implementation 1114 supports strong separation and supplies the Compound Name SPI.

Figure 13A:
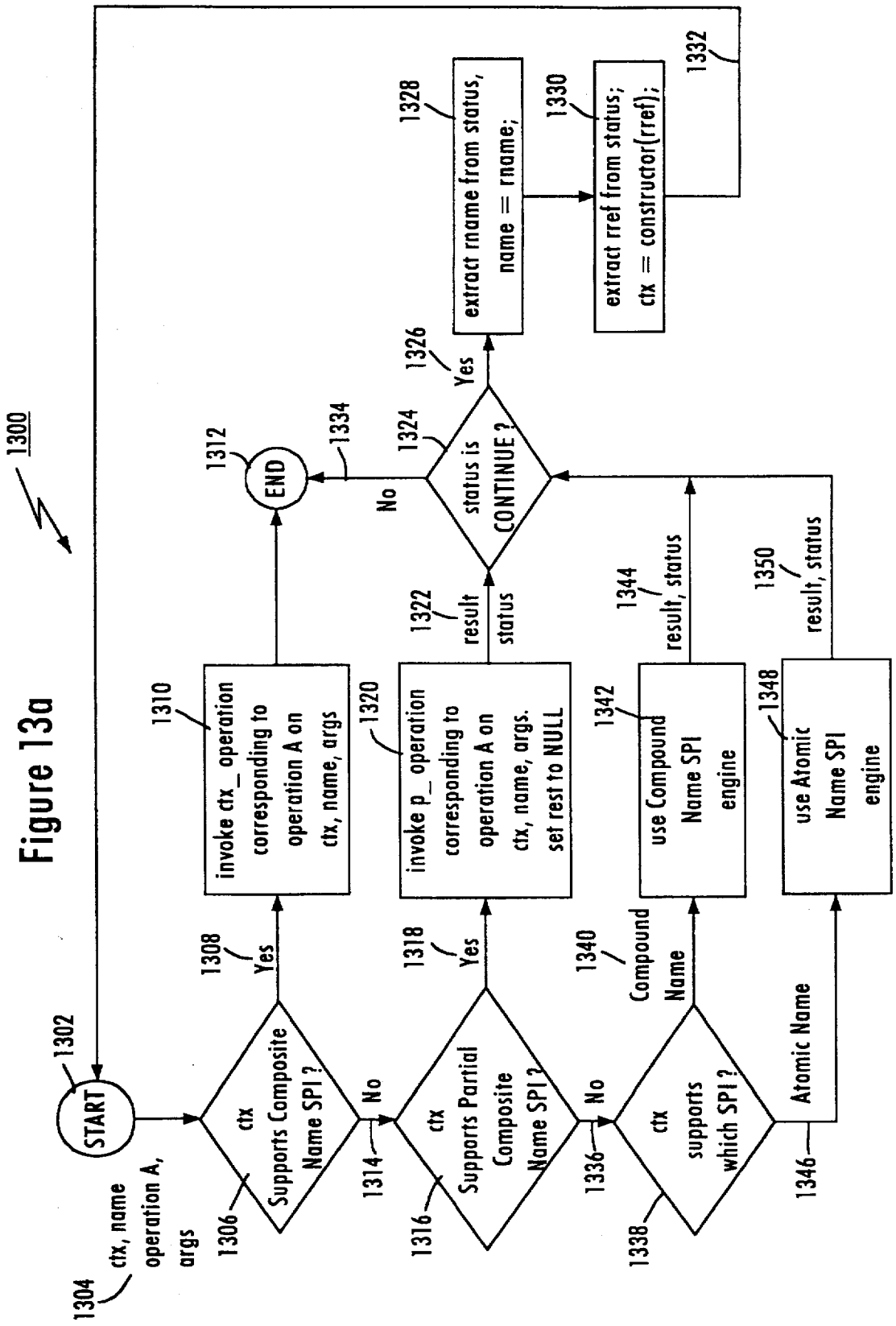
FIGS. 13a, 13b & 13c illustrate a flow chart showing the general operations of a system implementing the Federated Naming Framework.

FIG. 13a illustrates the process employed by the FN Framework to take input from the client application, and interacting with the appropriate FN SPIs, to accomplish the operation on the composite name requested by the client application.

Referring now to FIG. 13a, the client application supplies input to the FN Framework 1302 consisting of a context handle, a composite name, operation to be performed, and one or more additional arguments required by the operation (ctx, name, operation A, args) 1304. The FN Framework first loads in the context implementation pointed to by the context handle ctx and determines which FN SPI is supported by ctx 1306, 1316, 1340 and 1346.

FN Framework Interactions with Composite Name SPI

If the context implementation supports Composite Name SPI 1308 the FN Framework invokes the operation (ctx—) in the context implementation for ctx appropriate for operation A, supplying it with the arguments for the operation (name, args) 1310. The results of performing this operation are returned to the client application 1312.

Consider the following example for a context implementation that supplies the Composite Name SPI.

name is "a=b/c=d/e/f/g" (which spans two naming systems; "a=b/c=d" belongs to one naming system and "e/f/g" belongs to another naming system), operation A is "lookup()"

args is empty (there are no other arguments).

The FN Framework supplies the arguments ("a=b/c=d/e/f/g", "lookup()", { ≡ }) to the context implementation (CC1) of ctx. CC1 performs the ctx_lookup() operation on the composite name "a=b/c=d/e/f/g" as follows:

ref=ctx→ctx_lookup("a=b/c=d/e/f/g",&status);

and returns the result of that operation (ref) to the FN Framework, which in turn returns the result to the client application.

The above example illustrates how the FN Framework employed one context implementation CC1, to perform an operation on a composite name that spanned two naming systems. CC1 used the Composite Name SPI, and therefore is expected to process the composite name in its entirety, even when the composite name spanned multiple naming systems. Neither the Client application that used the FN Framework nor the FN Framework itself had any built-in knowledge about CC1. The FN Framework used the Composite Name SPI to communicate with CC1.

FN Framework Interactions with Partial Composite Name SPI

If the context implementation supports Partial Composite Name SPI 1318 the FN Framework invokes the operation (p_) in the context implementation for ctx, appropriate for operation A, supplying it with the arguments for the operation (name, args) 1320. The context implementation returns the results of invoking the p_operation and status 1322 to the FN Framework. Upon return from the p_operation, if the status of the operation 1324 indicates that the operation has gone as far as it could (either succeeded or could not be continued) 1334, the FN Framework returns the results of the operation to the client application 1312. If the status indicates that the operation needs to be continued 1326, the FN Framework extracts information from status 1328 to continue the operation. The status object contains:

rname: the remaining part of name that has not yet been processed, and rref the reference of the context to continue the operation. The FN Framework uses rname to update name. In other words, rname effectively becomes the new name argument to be used in the next iteration through the FN Framework. The FN Framework also uses rref from the status object to construct a new context handle, ctx_new. ctx_new is created by invoking the constructors operation supplied by the context implementation associated with rref 1330. ctx is updated to be ctx_new and effectively becomes the new ctx argument to be used in the next iteration through the FN Framework. The FN Framework then repeats the procedure for determining which FN SPI the context implementation of the new ctx supports 1332 and then supplies the new arguments (name, operation A, args) to the new context implementation.

To illustrate the above, consider the following example for a context implementation (PC1) that supplies the Partial Composite Name SPI.

name is "a=b/c=d/e/f/g" (which spans two naming systems; "a=b/c=d" belongs to one naming system and "e/f/g" belongs to another naming system), operation A is "lookup()"

args is empty (there are no other arguments).

The FN Framework supplies the input ("a=b/c=d/e/f/g", "lookup()", {}) to the context implementation (PC1) of ctx. PC1 performs the p_lookup() operation on the composite name "a=b/c=d/e/f/g" as follows:

ref=ctx→p_lookup("a=b/c=d/e/f/g",&status);

and returns the result of that operation (ref) to the FN Framework.

Assume for this example that PC1 processes "a=b/c=d" and returns a CONTINUE status to the FN Framework. In addition, it returns two pieces of status information:

rname—the remaining name ("e/f/g")

rref—the reference of the context to continue the operation (reference bound to "a=b/c=d").

The FN Framework uses rref to identify the context implementation (PC2) to use, and invokes the constructors implementation from PC2 to construct a new context handle, ctx_new. The FN Framework replaces the old value of ctx with ctx_new. The FN Framework also replaces the old value of name with rname. The FN Framework now has sufficient information to continue the process.

Assume that the new ctx also exports the Partial Composite Name SPI. The FN Framework supplies ("e/f/g", "lookup()", {}) to PC2. PC2 performs p_lookup() on the composite name "e/f/g" as follows:

ref=ctx→p_lookup("e/f/g",&status);

Assume for this example that this operation ends successfully at this point. PC2 returns the reference (ref) bound to "e/f/g" to the FN Framework, which returns it to the client application.

The above example illustrates how the FN Framework employed two context implementations, PC1 and PC2, both of which used the Partial Composite Name SPI, to perform an operation on a composite name that spanned two naming systems. Neither the Client application that used the FN Framework nor the FN Framework itself had any built-in knowledge about PC1 or PC2. The FN Framework used the Partial Composite Name SPI to communicate with both PC1 and PC2.

FN Framework Interactions with Compound Name SPI

Figure 13B:
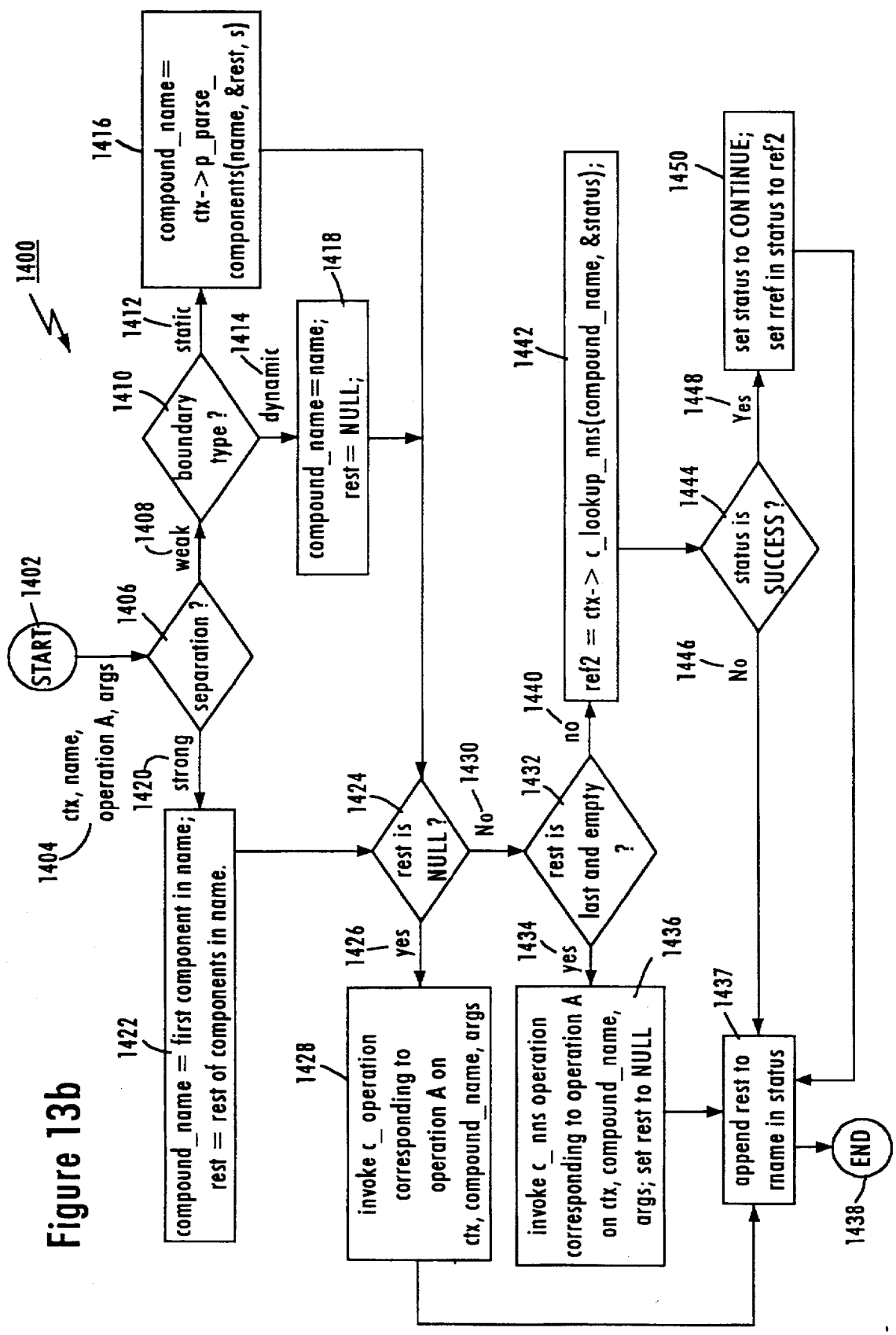

If the context implementation supports Compound Name SPI 1340, the FN Framework executes the algorithm described by the Compound Name SPI Engine 1342 (this is shown in detail in FIG. 13b). The output of the engine are the result of the operation and status 1344. If the status is CONTINUE 1326, the FN Framework constructs a new value for name by using the remaining name field (rname) from status 1328. Then, it extracts rref from status to construct a context handle new_ctx and replaces the old contents of ctx with it. The FN Framework then repeats the process from the beginning 1332 using the revised name and context handle ctx. If the status is not CONTINUE 1334 the FN Framework system returns 1312.

Referring now to FIG. 13b, if the context implementation supports the Compound Name SPI, the FN Framework executes the algorithm described by the Compound Name SPI engine 1400 (block 1342 in FIG. 13a) on the input (ctx, name, operation A, and args) 1404. In FIG. 13b, the FN Framework must first determine which part of the input, name, is to be processed by this context. That is, because the context supports a Compound Name SPI, the FN Framework must obtain the compound name, compound_name, for the context to work on. The remainder of name unused by this context is kept in a variable called rest.

If the context implementation supports strong separation 1420, compound_name is simply the first component in name and rest is all of name without the first component 1422.

If the context supports static weak separation 1408, 1412, FN Framework invokes the p_parse_component() function supplied by the context implementation to extract the initial components (compound_name) of the composite name, name, that belongs to the naming system of this context. p_parse_component() returns any residual not consumed by this naming system in rest 1416.

If the context implementation supports dynamic weak separation 1414, FN Framework uses the entire name as compound_name for the context implementation. This is because the context implementation will determine dynamically which part of compound_name should be consumed and set the remaining name field, rname, in status appropriately. rest is set to NULL 1418.

At this point, for all the different types of separation, FN Framework has compound_name set to be the compound name to supply to the context implementation, and rest set to the unused part of name. If rest is NULL 1426, compound_name is the last component in name to be processed. For this case, FN Framework invokes the c_operation from the context implementation corresponding to operation A, supplying it with the arguments ctx, compound_name and args 1428. If rest is not NULL 1430, but is the last component in name and is an empty string 1434, the Client application is specifying that it wants to operate on the next naming system pointer associated with compound_name. For this case, FN Framework invokes the c_nns operation from the context implementation corresponding to operation A, supplying it with the arguments ctx, compound_name and args 1436. If rest is not the last component in name or if it is the last but not an empty string 1440, the context named by compound_name is acting as an intermediate context. For this case, the FN Framework invokes the operation c_lookup_nns() from the context implementation on ctx, compound_name and args 1442. If the result (ref2) of c_lookup_nns() is successful 1448, it would contain the reference to the next naming system to continue the operation; consequently, upon a successful return from c_lookup_nns(), the status is changed to CONTINUE 1450 to indicate that the operation should be continued and the rref field of status is set to ref2.

At this point, the FN Framework does the following administration of the status object before exiting the Compound Name SPI Engine. The rest variable contains the part of name that has yet to be processed. Regardless of whether the operation succeeded, rest must be appended to the rname field of the status object, ensuring that rname accurately indicates the remaining part of name that still needs further processing 1437. The FN Framework then exits the Compound Name SPI Engine and continues at 1344 in FIG. 13a (this is described in detail above in the Partial Composite Name section).

To illustrate the above, consider the following example for a context implementation (C1) that supplies the Compound Name SPI.

name is "a=b/c=d/e/f/g" (which spans two naming systems; "a=b/c=d" belongs to one naming system and "e/f/g" belongs to another naming system), operation A is "lookup()"

args is empty (there are no other arguments).

Assume for this example that C1 supports static weak separation.

The FN Framework invokes p_component_parser() from C1 in order to extract compound_name and rest arguments.

compound_name=ctx→p_component_parser("a=b/c=d/e/f/g", &rest, &pstats); Assume that p_component_parser() in C1 uses the equal character ('=') to determine which components of the name belong to its naming system. compound_name then contains "a=b/c=d"; rest contains "e/f/g". Because rest is neither null or the last component, the context named by "a=b/c=d" is in an intermediate naming system. The FN Framework supplies the input ("a=b/c=d", "lookup_nns()", }≡) to the context implementation (C1) of ctx. C1 performs the c_lookup_nns() operation on the compound name "a=b/c=d".

*ref2=ctx→c__lookup__nns("a=b/c=d",&status)* and returns the result of that operation (ref2) to the FN Framework.

Assume for this example that this operation succeeded. The FN Framework then sets status to CONTINUE and sets the resolved reference field, rref, of status to ref2. It appends rest to the remaining name field, rname of status.

*rname("e/f/g")*

*rref(result of c__lookup__nns("a=b/c=d", . . . )operation)*

The FN Framework then uses rref to identify the context implementation (C2) to use, and invokes the constructor() implementation from C2 to construct a new context handle, ctx__new. The FN Framework replaces the old value of ctx with ctx__new. The FN Framework replaces the old value of name with rname. The FN Framework now has sufficient information to continue the process.

Assume that C2 supplies the Compound Name SPI and supports dynamic weak separation. The FN Framework sets rest to NULL and supplies the input ("e/f/g", "lookup__up ()", {}) to C2. C2 performs c__lookup() on the composite name "e/f/g" as follows:

*ref=ctx→c__lookup("e/f/g",&status);*

Assume for this example that this operation ends successfully at this point. C2 returns the reference (ref) bound to "e/f/g" to the FN Framework. Because rest is NULL, no update to the contents of status is required. The FN Framework returns ref to the client application.

The above example illustrates how the FN Framework employed two context implementations C1 and C2, both of which used the Compound Name SPI, to perform an operation on a composite name that spanned two naming systems. C1 supported static weak separation while C2 supported dynamic weak separation. Neither the Client application that used the FN Framework nor the FN Framework itself had any built-in knowledge about C1 or C2. FN Framework used the Compound Name SPI to communicate with both C1 and C2.

FN Framework Interactions with Atomic SPI

Figure 13C:
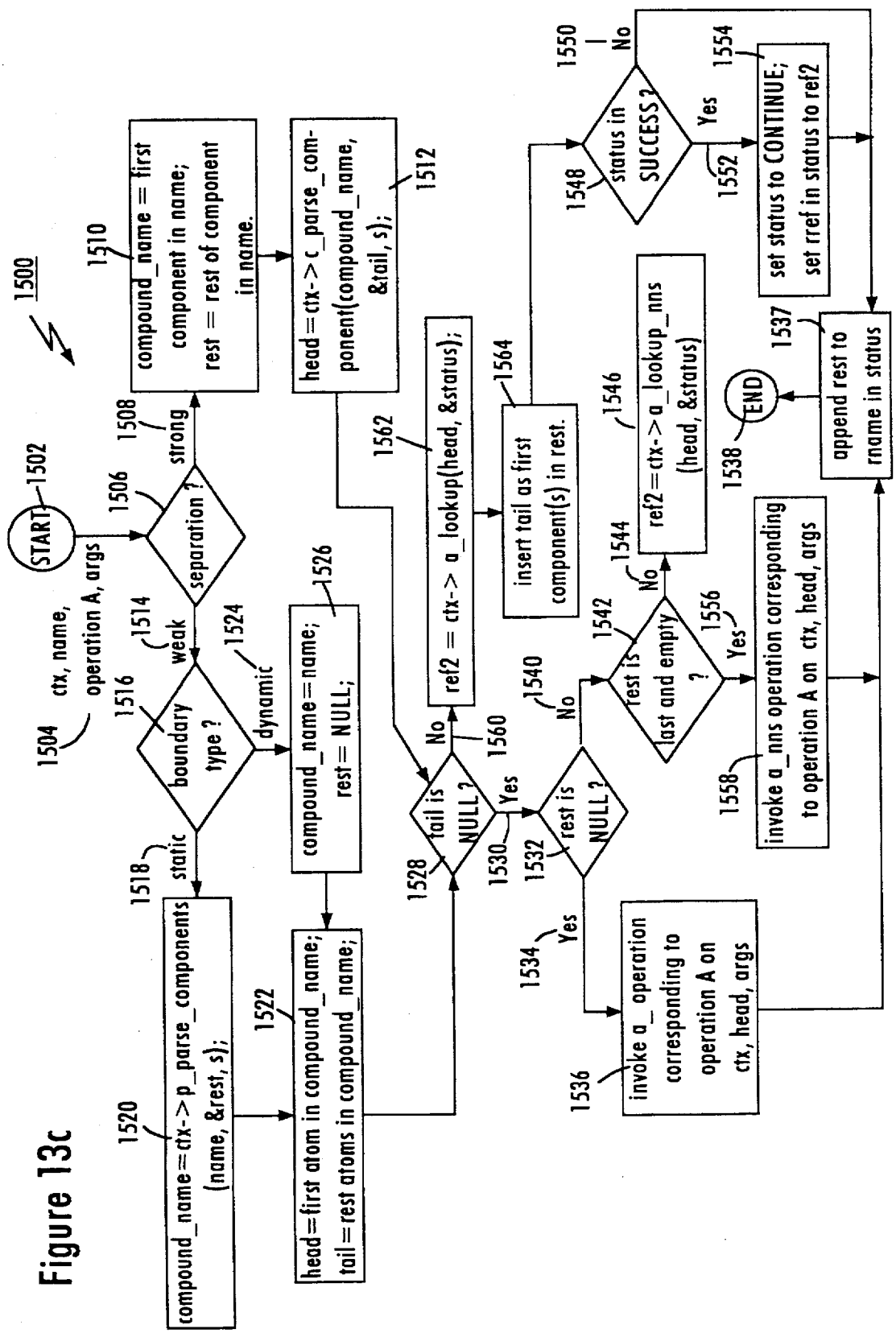

Returning now again to FIG. 13a, if the context implementation supports Atomic Name SPI 1346, the FN Framework executes the algorithm described by Atomic Name SPI Engine 1348 (this is shown in detail in FIG. 13c). The output of the engine are the result of the operation and status 1350. If the status is CONTINUE 1326, the FN Framework constructs a new value for name by using the remaining name field (rname) from status 1328. Then, it extracts rref from status to construct a context handle new__ctx and replaces the old contents of ctx with it. The FN Framework then repeats the process from the beginning 1332 using the revised name and context handle ctx. If the status is not continue 1334 the FN Framework system returns 1312.

If the context implementation supports the Atomic Name SPI (1346 in FIG. 13a), the FN Framework executes the algorithm described in the Atomic Name SPI engine 1500 in FIG. 13c. In FIG. 13c the FN Framework must first determine which part of the input, name, is to be processed by this context. That is, because the context supports an Atomic Name SPI, the FN Framework must obtain the atomic name, head, for the context to work on. It does this in two steps. First it needs to get the compound name, compound__name, from name, and then, from compound__name, the atomic part, head, to process. The remainder of name not part of compound__name is kept in a variable called rest. The remainder of compound__name not part of head is kept in a variable called tail.

If the context supports strong separation 1508, compound__name is simply the first component in name and rest is all of name without the first component 1510. The FN Framework then invokes the c__parse-component() function (described earlier) supplied by the context implementation to extract the atomic component (head) to process. c__parse__component() also returns the rest of compound__ name without head in tail 1512.

If the context supports static weak separation 1514 1518, the FN Framework invokes the p__parse__component() function (described earlier) supplied by the context implementation to extract the initial components (compound__ name) of the composite name, name, that belongs to the naming system of this context 1520. p__parse__component() returns any residual not consumed by this naming system as rest 1522.

If the context implementation supports dynamic weak separation 1524, the FN Framework uses the entire name as compound__name for the context implementation. This is because the context implementation will determine dynamically which part of compound__name should be consumed and set the return status appropriately. rest is set to NULL 1526.

For both forms of weak separation, head is the first component in compound__name and tail is the rest of compound__name without head 1522.

At this point, for all the different types of separation, FN Framework has compound__name set to be the compound name that belongs to the naming system of this context, ctx, and rest set to the unused part of name. Furthermore, head is set to the atomic name from compound__name to be processed by ctx and tail is set to the rest of compound__ name.

If tail is not NULL 1560, then there are more atoms to be processed in compound__name than just head and that the context named by head is an intermediate context within the same naming system. FN Framework invokes a__lookup() from the context implementation on head to obtain the reference (ref2) bound to head 1562. After invoking a__lookup(), the FN Framework inserts the contents of tail as the first component(s) in rest to account for the components not yet processed by this context implementation 1564. rest is appended to the contents of the remaining field, rname, of the status object 1537. If the operation is successful 1552, FN Framework sets the status of the operation to CONTINUE 1554 to indicate that the operation needs to be continued, and sets the resolved reference field (rref) of status to ref2. The FN Framework then exits the engine 1538.

If tail is NULL 1530, then head is the last atom to be processed in the naming system associated with ctx. If rest is NULL 1534, then the target context has been reached; the FN Framework invokes the a__operation from the context implementation corresponding to operation A 1536 and exits the engine 1538.

If tail is NULL 1530 but rest is not the last and empty component in name 1544, then the context named by head is an intermediate context connecting this naming system to the next. The FN Framework invokes the operation a__lookup__nns() on head to obtain the reference (ref2) to the next context (in the next naming system) to continue the operation 1546. If the operation is successful 1552, FN Framework sets the status to CONTINUE 1554 to indicate that the operation should be continued, and sets the resolved reference field (rref) in status to be (ref2), and exits the engine 1538.

If tail is NULL 1530 but rest is the last and empty component in name 1556, then the operation is to be effected on the next naming system associated with head. FN Framework invokes the a_nns operation from the context implementation with the arguments ctx, head, and args 1558 and then exits the engine 1538.

Upon exit from the Atomic Name SPI Engine 1350, the FN Framework continues as described above for Partial Composite Name section (1324 in FIG. 13*a*).

To illustrate the above, consider the following example for a context implementation (A1) that supplies the Atomic Name SPI.

name is "a=b/c=d/e/f/g" (which spans two naming systems; "a=b/c=d" belongs to one naming system and "e/f/g" belongs to another naming system), operation A is "lookup()"

args is empty (there are no other arguments). Assume for this example that A1 supports static weak separation.

The FN Framework invokes p_component_parser() from A1 in order to extract compound_name and rest arguments.

compound_name=ctx→p_component_parser("a=b/c=d/e/f/g", &rest,&pstats);

Assume that p_component_parser() in A1 uses the equal character ('=') to determine which components of the name belong to its naming system. compound_name then contains "a=b/c=d"; rest contains "e/f/g". FN Framework then extracts head and tail from compound_name: head becomes "a=b", tail becomes "c=d". Because tail is not NULL, the context named by "a=b" is an intermediate context within the same naming system. The FN Framework supplies the input ("a=b", "lookup()", {}) to the context implementation (A1) of ctx. A1 performs the a_lookup() operation on the atomic name "a=b" as follows:

ref2=ctx→a_lookup("a=b",&status);

and returns the result of that operation (ref2) to the FN Framework.

Assume for this example that this operation succeeded. The FN Framework then sets status to CONTINUE and sets the resolved reference field, rref, of status to ref2. It then inserts tail ("c=d") in front of rest ("e/f/g"); this ("c=d/e/f/g") becomes the new rest. The FN Framework then appends rest to the remaining name field, rname of status.

rname("c=d/e/f/g")

rref(result of a_lookup("a=b", ...)operation)

FN Framework resets rest to NULL. The FN Framework then uses rref to construct the handle to the next context object. FN Framework supplies rref to the constructors implementation from A1 to construct a new context handle, ctx_new. The FN Framework replaces the old value of ctx with ctx_new. The FN Framework replaces the old value of name with rname ("c=d/e/f/g"). The FN Framework now has sufficient information to continue the process.

The FN Framework supplies the input ("c=d/e/f/g", "lookup_up()", {}) to A1. Following the Atomic Name SPI Engine, through this iteration, head is "c=d" and tail is NULL. rest ("e/f/g") is the last and empty component in name, which means that the context named by "c=d" is the last context in an intermediate naming system. FN Framework invokes a_lookup_nns() on "c=d" to get a reference to the next naming system to continue the operation. A1 performs a_lookup_nns() on the atomic name "c=d" as follows:

ref2=ctx→a_lookup_nns("c=d",&status);

Assume for this example that this operations ends successfully at this point. A1 returns the reference (ref2) bound to the next naming system of "c=d" to the FN Framework. The FN Framework then sets the status of the operation to CONTINUE, sets the resolved reference part (rref) of the status to ref2, and appends rest ("e/f/g") to the remaining name (rname) part in status. At this point, FN Framework has resolved to the next naming system pointed to by "a=b/c=d" and must continue the operation on "e/f/g". Assume for this example that the context implementation C2 associated with the new rref supplies the Compound Name SPI using dynamic weak separation. The FN Framework sets rest to NULL and supplies the input ("e/f/g", "lookup_up()", {}) to C2. C2 performs c_lookup() on the composite name "e/f/g" as follows:

ref=ctx→c_lookup("e/f/g",&status);

Assume for this example that this operations ends successfully at this point. C2 returns the reference (ref) bound to "e/f/g" to the FN Framework. Because "e/f/g" was the last component in name (i.e. rest is NULL), no update to the contents of status is required. The FN Framework returns ref to the client application.

The above example illustrates how the FN Framework employed two context implementations, A1 and C2 to perform an operation on a composite name that spanned two naming systems. A1 was a context implementation that used the Atomic Name SPI and supported static weak separation. C2 was a context implementation that used the Compound Name SPI and supported dynamic weak separation. Neither the Client application that used the FN Framework nor the FN Framework itself had any built-in knowledge about A1 or C2. FN Framework communicated with A1 using the Atomic Name SPI and communicated with C2 using the Compound Name SPI.

The above detailed descriptions indicate the preferred embodiment at this time. However, those skilled in the art will recognize that various similar implementations of these operations are possible and are within the scope of the present invention.

D. Context Implementation Linkage

The third element of the present invention is the mechanism used by the FN Framework to invoke different context implementations.

In the preferred embodiment, a context implementation gets linked to an application by the use of constructors. All access to a context is via its context handle. The context handle is obtained by calling a constructor, named using a pre-defined scheme described below, that may call other internal constructors specific to the FN SPI. The FN SPI constructors return handles to context objects that supply the appropriate FN SPI, using a scheme similar to that described in FIG. 6. Subsequent operations involving the context handle will trigger the corresponding operation supplied by the context implementation via the FN SPI.

FIG. 10 illustrates the relationship between context implementations 1110, 1112, 1114, naming services 1116, 1118, 1120 and the FN framework 1108. Code for a particular context implementation is uniquely identified using the context's reference and address type(s). The constructors located within context implementations are also uniquely identified using the context's reference and address type(s). For example, as illustrated earlier, the following illustrates a code fragment of how the constructor might be called:

ctx=constructor(reference);

where ctx is a handle to a context object reference is a reference obtained by looking up a name.

New and arbitrary naming and directory services are made accessible to applications without being recompiled because of the architecture of the FN Framework and its definition and use of the FN SPI. The FN Framework has no dependencies on particular context implementations, only on the interface (FN SPI) provided by the context implementations. Because of this, the FN Framework is able to select different context implementations to use upon demand through the use of the constructors, without any changes to the FN Framework or the client application.

When the operating environment in which the FN Framework and context implementations are deployed has support for dynamic linking, the application gains the further advantage that it need not be re-linked or stopped. When dynamic linking is available, the FN Framework is able to link in different context implementations dynamically upon demand by use of the constructors, thereby, not requiring the application to be linked beforehand with all possible context implementations that it might need.

It will be appreciated by those skilled in the art that various modifications and alterations may be made in the preferred embodiments of the invention disclosed herein without departing from the scope of this invention. Accordingly, the scope of the invention is not to be limited to the particular invention embodiments discussed above, but should be defined only by the claims set forth below and equivalents thereof.

What is claimed is:

1. A Federated Naming Framework System for use in a distributed computer system, having at least one computer having a central processing unit, a memory, a display and an input/output mechanism, to provide an interface system between a client application configured to use a composite name spanning two or more naming systems and at least one naming service mechanism for use in resolving the composite name, said Federated Naming Framework System comprising:

a federated naming framework mechanism in a computer memory, coupled to said client application and configured to resolve a composite name, received from a client application, of an object by use of a naming service mechanism; and one or more naming service mechanisms configured to conform to a federated naming service provider interface type and coupled to the federated naming framework mechanism;

the one or more naming service mechanism configured to indicate support for strong or weak separation in said one or more respective naming systems, in which additional naming service mechanisms can be made available to a client application without interruption of service provided by the federated naming framework mechanisms.

2. The Federated Naming Framework System of claim 1 wherein said naming service mechanism is located by the federated naming framework mechanism by use of a constructor mechanism.

3. The Federated Naming Framework System of claim 1 wherein the federated naming framework mechanism uses a context handle provided by the client application to identify a related context implementation and to determine which federated naming service provider interface this context implementation supports.

4. The Federated Naming Framework System of claim 1 wherein said naming service provider interface type is configured to communicate with an atomic naming service provider.

5. The Federated Naming Framework System of claim 1 wherein said naming service provider interface type is configured to communicate with a compound naming service provider.

6. The Federated Naming Framework System of claim 1 wherein said naming service provider interface type is configured to communicate with a partial composite naming service provider.

7. The Federated Naming Framework System of claim 1 wherein said naming service provider interface type is configured to communicate with a composite naming service provider.

8. The Federated Naming Framework System of claim 1 wherein said naming service provider interface type is configured to communicate with a compound naming service provider and an atomic naming service provider.

9. The Federated Naming Framework System of claim 1 wherein said naming service provider interface type is configured to communicate with a partial composite naming service provider and a compound naming service provider.

10. The Federated Naming Framework System of claim 1 wherein said naming service provider interface type is configured to communicate with a partial composite naming service provider and a compound naming service provider and an atomic naming service provider.

11. An improved method for resolving a composite name of an object, the composite name used by a client application in a distributed computer system, having at least one computer having a central processing unit, a memory, a display and an input/output mechanism, the method comprising the steps of:

providing a federated naming framework mechanism in a computer memory, configured to be callable by the client application and configured to resolve the composite name of the object by use of a naming service mechanism, the naming service mechanism comprising a context implementation conforming to a designated federated naming service provider interface;

under computer control, the client application calling the federated naming framework mechanism, the client application supplying inputs comprising a context handle, a composite name, a designated operation to be performed and one or more arguments required by the operation;

the federated naming framework mechanism using the context handle to load a context implementation pointed to by the context handle and determining which federated naming service provider interface the context implementation supports;

the federated naming framework mechanism invoking a first operation appropriate to a naming service provider interface supported by the context implementation and appropriate to the designated operation called by the client application, the first operation invoked on the context implementation, the context implementation returning results of the invoked first operation and returning a status value to the federated naming framework mechanism; if the status value indicates that the first operation either succeeded, thereby having resolved the composite name, or could not be continued, the federated naming framework mechanism returning the results of the first operation to the client application; and if the status value indicates that the operation should be continued, the federated naming framework mechanism continues to process a remainder of the composite name based on the status information returned.

12. The method of claim 11 wherein the federated naming framework mechanism using the context handle to load a context implementation pointed to by the context handle and determining which federated naming service provider interface the context implementation supports comprises the additional steps of:

determining that the federated naming service provider interface supported is a Compound Name service provider interface;

determining which part of the composite name supplied by the client application is to be processed by a context implementation related to the Compound Name service provider interface by the following steps:

if the context implementation related to the Compound Name service provider interface supports strong separation then using a first component of the composite name as a designated part of the composite name supplied by the client application is to be processed;

if the context implementation related to the Compound Name service provider interface supports static weak separation then using a parse-component mechanism supplied by the context implementation related to the Compound Name service provider interface to extract initial components of the composite name that belong to a naming system supported by the context implementation related to the Compound Name service provider interface, which initial components are to be used as the designated part of the composite name supplied by the client application is to be processed; and if the context implementation related to the Compound Name service provider interface supports dynamic weak separation then using the entire composite name as the designated part of the composite name supplied by the client application is to be processed.

13. The method of claim 11 wherein the federated naming framework mechanism using the context handle to load a context implementation pointed to by the context handle and determining which federated naming service provider interface the context implementation supports comprises the additional steps of:

determining that the federated naming service provider interface supported is a Composite Name service provider interface; and using the entire composite name as the designated part of the composite name supplied by the client application which is to be processed by the context implementation.

14. The method of claim 11 wherein the federated naming framework mechanism using the context handle to load a context implementation pointed to by the context handle and determining which federated naming service provider interface the context implementation supports comprises the additional steps of:

determining that the federated naming service provider interface supported is a Partial Name service provider interface; and using the entire composite name as the designated part of the composite name supplied by the client application which is to be processed by the context implementation.

15. The method of claim 11 wherein the federated naming framework mechanism using the context handle to load a context implementation pointed to by the context handle and determining which federated naming service provider interface the context implementation supports comprises the additional steps of:

determining that the federated naming service provider interface supported is an Atomic Name service provider interface;

determining which part of the composite name supplied by the client application is to be processed by a context implementation related to the Atomic Name service provider interface by the following steps:

if the context implementation related to the Atomic Name service provider interface supports strong separation then using a parse-atomic-component mechanism supplied by the context implementation related to the Atomic Name service provider interface to extract a first atomic component (head) from a first component of the composite name as a designated part of the composite name supplied by the client application which is to be processed;

if the context implementation related to the Atomic Name service provider interface supports static weak separation then using a parse-component mechanism supplied by the context implementation related to the Atomic Name service provider interface to extract an ordered list of initial components of the composite name that belong to a naming system supported by the context implementation related to the Atomic Name service provider interface, and from this ordered list of initial components, extract a first component to be used as the designated part of the composite name supplied by the client application which is to be processed; and if the context implementation related to the Atomic Name service provider interface supports dynamic weak separation then using the entire composite name as the designated part of the composite name supplied by the client application which is to be processed.

16. The method of claim 11 wherein said naming service provider interface mechanism is further configured to communicate with one or more naming services.

17. The method of claim 11 wherein said naming service provider interface mechanism is further configured to communicate with a compound naming service provider and an atomic naming service provider.

18. The method of claim 11 wherein said naming service provider interface mechanism is further configured to communicate with a partial composite naming service provider and a compound naming service provider.

19. The method of claim 11 wherein said naming service provider interface mechanism is further configured to communicate with a partial composite naming service provider and a compound naming service provider and an atomic naming service provider.

20. A computer program product comprising:

a computer usable medium having computer readable program code mechanisms embodied therein configured to resolve a composite name of an object called by a client application, the composite name spanning two or more naming systems, the computer readable program code mechanisms in said computer program product comprising:

computer readable code mechanisms configured to accept a call from the client application to resolve the composite name by a federated naming framework mechanism, configured to further use a naming service mechanism to perform a name resolution;

computer readable code mechanisms configured to contain one or more naming service mechanism which conform to a federated naming service provider interface wherein the one or more naming service mechanisms have no direct connection to the client application; and computer readable code mechanisms configured to cause the one or more naming service mechanisms to indicate support for strong or weak separation in said one or more their respective naming systems.

21. The computer program product of claim 20 wherein the naming service mechanism to be connected to the federated naming framework mechanism is located by the federated naming framework mechanism by use of a constructor mechanism.

22. A computer program product comprising:

a computer usable medium having computer readable program code mechanisms embodied therein configured to resolve a composite name of an object called by a client application, the computer readable program code mechanisms in said computer program product comprising:

computer readable code mechanisms configured to accept a call from the client application to resolve the composite name by a federated naming framework mechanism, configured to further use one or more naming service mechanisms to perform a name resolution, said one or more naming service mechanisms located by use of a constructor mechanism; and computer readable code mechanisms configured to cause the one or more naming service mechanisms each of which provides a naming service, to be configured to conform to a federated naming service provider interface and to indicate support for strong or weak separation in said one or more respective naming systems; in which additional naming service mechanism can be made available to a client application without interruption of service provided by the federal naming framework mechanisms.

23. A computer program product comprising:

a computer usable medium having computer readable program code mechanisms embodied therein configured to resolve a composite name of an object called by a client application, the computer readable program code mechanisms in said computer program product comprising:

computer readable code mechanisms configured to accept a call from the client application to resolve the composite name by a federated naming framework mechanism, configured to further use one or more naming service mechanisms to perform a name resolution, said one or more naming service mechanisms located by use of a constructor mechanism; and computer readable code mechanisms configured to cause the naming service mechanisms to be connected to the federated naming framework mechanism in accordance with a federated naming service provider interface wherein a new naming service mechanism can be connected to the federated naming framework mechanism without impact to the client application.

24. The computer program product in claim 23 wherein the federated naming framework mechanism locates the one or more naming service mechanisms to perform a name resolution by use of a constructor mechanism.

25. A method for resolving a composite name of an object, the composite name used by a client application in a distributed computer system, having at least one computer having a central processing unit, a memory, a display and an input/output mechanism, the method comprising the steps of:

providing a federated naming framework mechanism in the computer memory, configured to be callable by the client application and configured to resolve the composite name of the object by use of a naming service mechanism, the naming service mechanism comprising a context implementation conforming to a designated federated naming service provider interface;

providing a process to allow the client application to call the federated naming framework mechanism, the client application supplying inputs comprising a context handle, a composite name, a designated operation to be performed and one or more arguments required by the operation;

providing a process to allow the federated naming framework mechanism to use the context handle to load a context implementation pointed to by the context handle and to determine which federated naming service provider interface the context implementation supports;

providing a process to allow the federated naming framework mechanism to invoke a first operation appropriate to a naming service provider interface supported by the context implementation and appropriate to the designated operation called by the client application, the first operation to be invoked on the context implementation, providing a process to allow the context implementation to return the results of the invoked first operation and to return a status value to the federated naming framework mechanism;

if the status value indicates that the first operation either succeeded, thereby having resolved the composite name, or could not be continued, providing a process to allow the federated naming framework mechanism to return the results of the first operation to the client application, and if the status value indicates that the first operation should be continued, providing a process to allow the federated naming framework mechanism to continue processing a remainder of the composite name.

26. The method of claim 25 wherein the step of providing a process to allow the federated naming framework mechanism to use the context handle to load a context implementation pointed to by the context handle and to determine which federated naming service provider interface the context implementation supports comprises the additional steps of:

providing a process to determine that the federated naming service provider interface supported is a Composite Name service provider interface; and providing a process to use the entire composite name as the designated part of the composite name supplied by the client application to be processed.

27. The method of claim 25 wherein the step of providing a process to allow the federated naming framework mechanism to use the context handle to load a context implementation pointed to by the context handle and to determine which federated naming service provider interface the context implementation supports comprises the additional steps of:

providing a process to determine that the federated naming service provider interface supported is a Partial Composite Name service provider interface;

providing a process to use the entire composite name as the designated part of the composite name supplied by the client application to be processed.

28. The method of claim 25 wherein the step of providing a process to allow the federated naming framework mechanism to use the context handle to load a context implementation pointed to by the context handle and to determine which federated naming service provider interface the context implementation supports comprises the additional steps of:

providing a process to determine that the federated naming service provider interface supported is a Compound Name service provider interface;

providing a mechanism to determine which part of the composite name supplied by the client application is to be processed by a context implementation related to the Compound Name service provider interface by the following steps:

if the context implementation related to the Compound Name service provider interface supports strong separation then using a first component of the composite name as a designated part of the composite name supplied by the client application to be processed;

if the context implementation related to the Compound Name service provider interface supports static weak separation then using a parse-component mechanism supplied by the context implementation related to the Compound Name service provider interface to extract initial components of the composite name that belong to a naming system supported by the context implementation related to the Compound Name service provider interface, which initial components are to be used as the designated part of the composite name supplied by the client application to be processed; and if the context implementation related to the Compound Name service provider interface supports dynamic weak separation then using the entire composite name as the designated part of the composite name supplied by the client application to be processed.

29. The method of claim 25 wherein the step of providing a process to allow the federated naming framework mechanism to use the context handle to load a context implementation pointed to by the context handle and to determine which federated naming service provider interface the context implementation supports comprises the additional steps of:

providing a process to determine that the federated naming service provider interface supported is a Atomic Name service provider interface;

providing a mechanism to determine which part of the composite name supplied by the client application is to be processed by a context implementation related to the Atomic Name service provider interface by the following steps:

if the context implementation related to the Atomic Name service provider interface supports strong separation then using a parse-atomic-component mechanism supplied by the context implementation related to the Atomic Name service provider interface to extract a first atomic component (head) from a first component of the composite name as a designated part of the composite name supplied by the client application which is to be processed;

if the context implementation related to the Atomic Name service provider interface supports static weak separation then using a parse-component mechanism supplied by the context implementation related to the Atomic Name service provider interface to extract an ordered list of initial components of the composite name that belong to a naming system supported by the context implementation related to the Atomic Name service provider interface, and from this ordered list of initial components, extract a first component to be used as the designated part of the composite name supplied by the client application which is to be processed; and if the context implementation related to the Atomic Name service provider interface supports dynamic weak separation then using a first component from the entire composite name as the designated part of the composite name supplied by the client application which is to be processed.

* * * * *